(12) United States Patent
Chang et al.

(10) Patent No.: US 8,296,466 B2
(45) Date of Patent: Oct. 23, 2012

(54) SYSTEM, CONTROLLER, AND METHOD THEREOF FOR TRANSMITTING DATA STREAM

(75) Inventors: Ching-Wen Chang, Hsinchu (TW); Huan-Sheng Li, Miaoli County (TW); Meng-Chang Chen, Taichung County (TW)

(73) Assignee: Phison Electronics Corp., Miaoli (TW)

( * ) Notice: Subject to any disclaimer, the term of this patent is extended or adjusted under 35 U.S.C. 154(b) by 854 days.

(21) Appl. No.: 12/414,968

(22) Filed: Mar. 31, 2009

(65) Prior Publication Data

US 2010/0186077 A1 Jul. 22, 2010

(30) Foreign Application Priority Data

Jan. 19, 2009 (TW) .............................. 98101917 A

(51) Int. Cl.
*G06F 3/00* (2006.01)
*G06F 13/00* (2006.01)

(52) U.S. Cl. .......... 710/5; 710/2; 710/8; 710/15; 710/36
(58) Field of Classification Search ................... 710/2, 5, 710/8, 15, 36
See application file for complete search history.

(56) References Cited

U.S. PATENT DOCUMENTS

| 2006/0156009 | A1* | 7/2006 | Shin et al. ................. 713/176 |
| 2008/0140909 | A1* | 6/2008 | Flynn et al. ................. 711/100 |
| 2010/0235899 | A1 | 9/2010 | Li | |

* cited by examiner

*Primary Examiner* — Scott Sun
(74) *Attorney, Agent, or Firm* — J.C. Patents

(57) ABSTRACT

A system, a controller, and a method thereof for transmitting data stream from a host to a peripheral device with a chip are provided. At least a part of a data stream is transmitted from the host to the peripheral device. Then, the host inerrably receives a response message generated by the chip by executing a plurality of read commands. The data stream and the response message have corresponding write tokens, and the write token of the data stream is compared with the write token of the response message to verify the accuracy of the response message.

36 Claims, 13 Drawing Sheets

SYSTEM, CONTROLLER, AND METHOD THEREOF FOR TRANSMITTING DATA STREAM

CROSS-REFERENCE TO RELATED APPLICATION

This application claims the priority benefit of Taiwan application serial no. 98101917, filed Jan. 19, 2009. The entirety of the above-mentioned patent application is hereby incorporated by reference herein and made a part of specification.

BACKGROUND OF THE INVENTION

1. Field of the Invention

The present invention relates to a system, a controller, and a method thereof for transmitting a data stream, and particularly, to a system, a controller, and a method thereof for transmitting a data stream from a host to a peripheral device with a chip.

2. Description of Related Art

Digital cameras, cellular phones, and MP3 players have grown rapidly in recent years, which result in a rapid increase in demand of storage media by users. For the advantages of non-volatility, power saving, small dimension, and having no mechanical structure, the flash memories are very suitable to be embedded in various portable multimedia devices as described above.

On the other hand, the user's increasing acceptance of electronic wallet and prepayment has resulted in increasing popularization of smart cards. The smart card is typically an integrated circuit (IC) chip which includes, for example, a microprocessor, a card operation system, a security module, and a memory module to allow predetermined operation performed by an owner of the smart card. With the ability to provide computing, encryption, bidirectional communication and security functions, the smart card not only stores data, but also protects the data stored therein. One exemplary smart card is the subscriber identification module (SIM) of cellular phones that use global system for mobile communication (GSM). However, the smart card has a limit in its storage capacity. Thus, the smart card has recently begun to be used in combination with a large storage memory card to expand the storage capacity of the smart card.

Conventionally, in use of the smart card in combination with a flash memory, a particular command is used to differentiate the data transmitted to the smart card from the data transmitted to the flash memory. This particular command may not be supported by the hardware or the driver. Moreover, in the related art, information of the particular command, which regards the type of the transmitted data stream, is compared to determine whether the transmitted data stream is of the command format of the smart card. However, this method often results in confusion of the command data of the smart card with the normal data (i.e., misinterpreting the normal data as the command data of the smart card).

In addition, in utilization of electronic products with a cache, due to the electronic products' own limits, data stream transmission between the smart card and the electronic products can not bypass the cache, which makes a response message generated by the smart card unable to be inerrably transmitted back to the electronic product that the smart card is attached to, thereby restraining the applications of the smart card on such electronic product having a cache. For example, in a cell phone with a Java system, since the Java system does not support commands, e.g. the command of NO Cache, that allows the direct access to the flash memory without using the cache, it can be difficult to combine the smart card and the flash memory into a memory card in the cell phone with the Java system. FIG. 1 is a functional block diagram of a host 10 equipped with a memory card 12. Referring to FIG. 1, the host 10 is a type of electronic product (e.g., a cell phone with a Java system) and has a cache 14. The memory card 12 includes a flash memory 16 and a smart card chip 18. All data between the host 10 and the memory 12 is transmitted through the cache 14. However, since the cache 14 temporarily stores recent data transmitted between the host 10 and the memory card 12, when the host 10 acquires data from the smart card chip 18, if the cache 14 already contains data matched with the address designated by the read command, the cache 14 will transmit the matched data to the host 10. However, in such a system, the response message of the smart card chip 18 may be often substituted by the data already existing in the cache 14, which significantly affects the encryption and security communication of the smart card chip 18.

Therefore, a system and a method that can inerrably transmit the response message of the smart card are required in the relevant utilization of the smart card.

SUMMARY

A system and a controller thereof for transmitting a data stream are provided in the present invention to inerrably transmit a response message of a smart card.

A method for transmitting a data stream is provided in the present invention to inerrably transmit a response message of a smart card.

The system, the controller, and the method of the present invention for transmitting and distributing a data stream not only can be utilized in the application of the combination of a flash memory and the smart card, but can also be used in the application of the combination of the flash memory and other chips so as to inerrably transmit the response messages of the aforesaid other chips. The other chips aforementioned may be radio frequency identification (RFID) chips, wireless transmission chips (i.e. bluetooth chips), or multimedia controller chips (i.e. digital recording chips).

The present invention provides a method for transmitting a data stream from a host to a peripheral device with a chip. The method comprises the following steps: generating a write token, and embedding the write token in a first data stream; transmitting a first write command to the peripheral device, the first write command being set to write the first data stream to the peripheral device; transmitting at least a portion of the first data stream to the chip, and recording the write token embedded in the first data stream; and sequentially transmitting a plurality of read commands to the peripheral device until the host receives a first response message from the peripheral device. The data within a specific data region of the first response message are produced by the chip in response to receiving at least a portion of the first data stream, and the first response message comprises the write token, the read commands are set to read data stored on a plurality of logical block addresses.

The present invention also provides a system for transmitting a data stream between a host and a peripheral device with a chip. The system has a data processing unit and a controller. The data processing unit is disposed in the host for handing operations of the peripheral device. The controller is disposed in the peripheral device and electrically connected to the chip. The controller generates a write token and embeds the write token in a first data stream. The host operates the data processing unit to transmit a write command to the controller, and the write command is set to write the first data stream to the peripheral device. The controller transmits at least a portion of the first data stream to the chip and records the write token embedded in the first data stream. When the host operates the data processing unit, the host sequentially transmits a plurality of read commands to the peripheral device until receiving a first response message from the controller. Data stored within a specific data region of the first response message are produced by the chip in response to receiving at least a portion of the first data stream. The first response message has the write token, and the read commands are set to read data stored on a plurality of logical block addresses.

The present invention provides a controller adapted for a peripheral device with a chip. The controller includes a micro processing unit and a buffer. The micro processing unit is used to control overall operations of the controller, and the buffer is used to store data temporarily. The micro processing unit transmits at least a portion of a first data stream from a host to the chip and records a write token embedded in the first data stream. After the portion of the first data stream has been transmitted to the chip, and before a first response message is transmitted from the micro processing unit to the host, the micro processing unit sequentially transmits a second response message to the host in respond to a plurality of read commands received from the host. Data within a specific data region of the first response message are produced by the chip in response to receiving at least a portion of the first data stream. After the micro processing unit receives data within the specific data region of the first response message from the chip, the micro processing unit transmits the first response message to the host, and the first response message has the write token.

The present invention provides a data processing unit disposed in a host. The host operates the data processing unit to perform the aforementioned method for transmitting the data stream so as to control the data stream transmission between the host and the peripheral device.

In light of the foregoing, the write tokens are transmitted with the write commands, and the response messages contain the corresponding write tokens. Consequently, when the host contains the cache, the data error resulted from closing the data processing unit is prevented so as to ensure the accuracy of data. Moreover, the controller of the peripheral device can also add the corresponding read tokens to the data streams that are transmitted back to the host. Therefore, when the collision occurs between the two write tokens that are generated consecutively by the host, the host can still accurately determine whether the response message generated by the smart card has been received.

In order to make the aforementioned and other features and advantages of the present invention more comprehensible, several exemplary embodiments accompanied with figures are described in detail below.

BRIEF DESCRIPTION OF THE DRAWINGS

The accompanying drawings are included to provide a further understanding of the exemplary embodiments of the invention, and are incorporated in and constitute a part of this specification. The drawings illustrate exemplary embodiments of the invention and, together with the description, serve to explain the principles of the invention.

DESCRIPTION OF EXEMPLARY EMBODIMENTS

A system, a controller, and a method thereof for transmitting a data stream between a host and a peripheral device having a chip are provided herein. The system includes a host and a peripheral device, wherein the host comprises a data processing unit and a cache. Moreover, the data stream is transmitted to the chip by transmitting a write command. Thereafter, a response message generated by the chip can be received inerrably by executing of a plurality of read commands. Herein, a write token is used to verify the accuracy of transmitted-back response message, so that the host can distinguish the response message as the previous response message temporarily stored in the cache or the current response message generated by the chip. Several exemplary embodiments of the present invention are described in the following with reference to accompany the drawings. However, it should be noted that the following exemplary embodiments are not to limit the scope of the present invention. For example, the system, the controller, and the method thereof for transmitting the data stream provided in the present invention can be adapted to the data stream transmission between the chip and the host having the cache so as to transmit the response message of the chip inerrably. The chip can be a radio frequency identification (RDIF) chip, a wireless transmission chip (i.e. a bluetooth chip), or a multimedia controller chip (i.e. a digital recording chip), etc.

[First Exemplary Embodiment]

Figure 1:
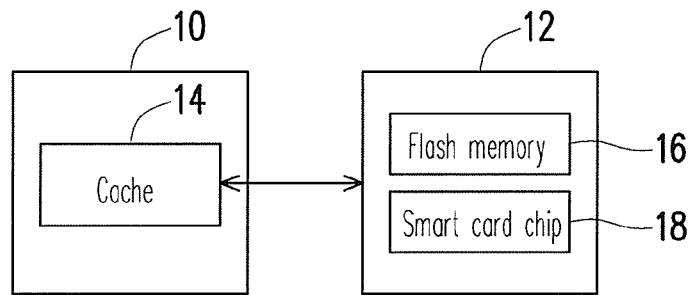
FIG. 1 is a functional block diagram of a host in combination with a memory card according to the related art.
Figure 2:
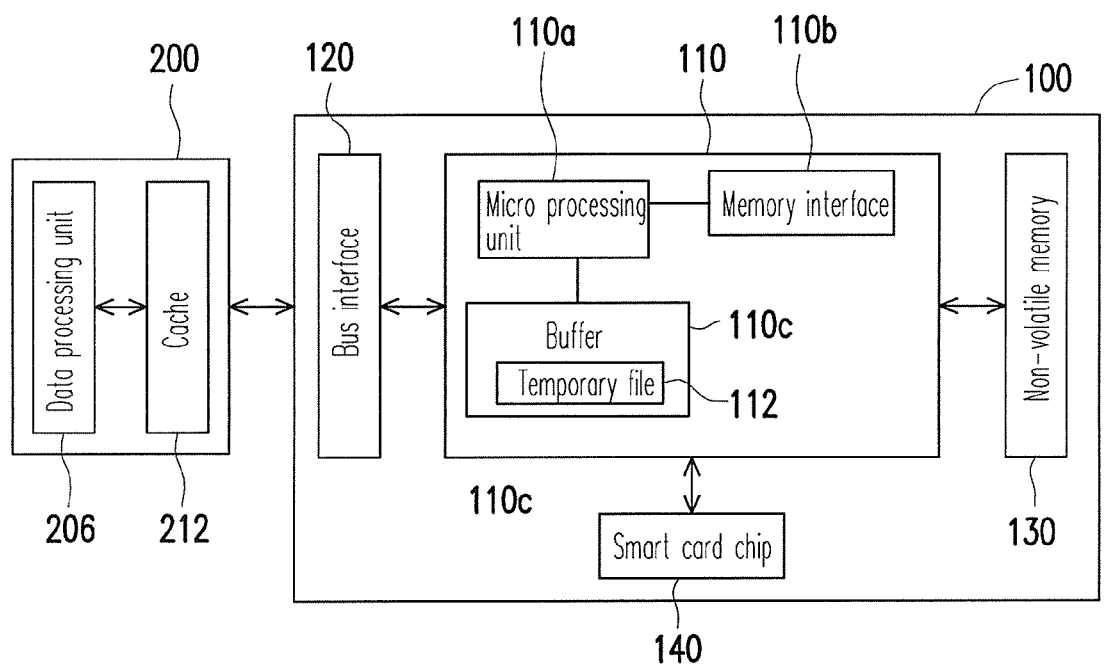
FIG. 2 is a functional block diagram illustrating a system for transmitting data stream according to a first exemplary embodiment of the present invention.

Referring to FIG. 2, FIG. 2 is a general block diagram illustrating a system for transmitting data stream according to a first exemplary embodiment of the present invention. In the exemplary embodiment, the system for transmitting the data stream includes a data processing unit 206 and a controller 110. The data processing unit 206 is disposed within a host 200, and the controller 110 is disposed in a peripheral device 100 to control operations of the peripheral device 100 and the data transmission between the peripheral device 100 and the host 200. In detail, the data processing unit 206 is disposed within the host 200 as a firmware. The firmware code comprising a plurality of machine instructions can be stored in a controller (not shown) of the host 200. The controller of the host 200 can include a micro processing unit (not shown), a buffer (not shown), and a data stream transmission module (not shown). Herein, the buffer and the data stream transmission module are coupled to the micro processing unit respectively. In this present exemplary embodiment, the data processing unit 206 is implemented in the host 200 as a firmware. However, the present invention is not limited thereto. In another exemplary embodiment of the present invention, the machine instructions of the data processing unit 206 may also be stored in a specific area (for example, a system area ) of the non-volatile memory 130 as a software. Similarly, when the peripheral device 100 is in operation, these machine instructions are loaded and executed by the host 200. Additionally, in another exemplary embodiment, the data processing unit 206 is implemented in the host 200 as a hardware comprising a plurality of logic gates to perform following operations to peripheral device 100. Moreover, the peripheral device 100 is usually used together with the host 200, such that the host 200 can transmit commands and data to the peripheral device 100. More particularly, the peripheral device 100 further includes a smart card chip 140 for executing functions such as security verification, etc. The controller 110 and the host 200 can execute the method for transmitting data according to the exemplary embodiment of the present invention to transmit a message to the smart card chip 140 and inerrably transmits back a response message of the smart card chip 140 to the host 200. The host 200 further includes a cache 212 for temporarily storing recently-used data of the host 200 so as to increase the overall data processing speed of the host 200.

In the present exemplary embodiment, the peripheral device 100 has a non-volatile memory 130, which is electrically connected to the controller 110, for storing normal data. However, it should be noted that the non-volatile memory 130 is an optional component rather than an essential component in the present invention. The controller 110 controls the overall operations of the peripheral device 100, such as, transmitting, storing, reading, and erasing of the data stream. The controller 110 includes a micro processing unit 110a, a memory interface 110b, and a buffer 110c. The micro processing unit 110a executes the commands transmitted by the data processing unit 206, and coordinates internal components of the controller 110 to control the overall operations of the controller 110. The memory interface 110b is electrically connected to the microprocessor unit 110a for accessing the non-volatile memory 130. In other words, the data to be written into the non-volatile memory 130 by the host 200 is converted to a format acceptable for the non-volatile memory 130 via the memory interface 110b. However, it should be noted that the non-volatile memory 130 is an optional component rather than an essential component in the present invention. Thus, in other exemplary embodiments of the present invention without the non-volatile memory 130, the controller 110 does not require the memory interface 110b.

The buffer 110c is used to temporarily store system data (e.g., logic to physical mapping table) or the data read or written by the host 200. In the present exemplary embodiment, the buffer 110c is a static random access memory (SRAM). However, it should be noted that the present invention is not limited thereto. Instead, the buffer of the present invention can be dynamic random access memory (DRAM), magnetoresistive random access memory (MRAM), phase change random access memory (PRAM), synchronous DRAM (SDRAM), or other suitable memories.

The smart card chip 140 is electrically connected to the controller 110 to execute functions such as computing, encryption, bidirectional communication, and security verification. In the exemplary embodiment of the present invention, the smart card chip 140 is a contact type smart card chip compatible with the standard of ISO 7816. Nevertheless, it should be noted that the present invention is not limited thereto. For example, the smart card chip 140 can be a contact or contact-less type smart card chip compatible with the standards of ISO 14443, ISO 15408, or other chip security standards. Moreover, it should be noted that the controller 110 and the smart card chip 140 can each be an independent chip, or can be integrated and packaged into a single chip.

In the exemplary embodiment of the present invention, the non-volatile memory 130 is a single level cell (SLC) NAND flash memory. However, the present invention is not limited herein. In another exemplary embodiment of the present invention, the non-volatile memory 130 may be a multi level cell (MLC) NAND flash memory or other suitable non-volatile memories. In addition, although not shown in the present exemplary embodiment, the controller 110 can further include function modules such as an error correction code (ECC) module and a power management module.

In the present exemplary embodiment, the peripheral device 100 can be the smart card or an integrated secure digital (SD) memory card having the non-volatile memory. It should be noted that in another exemplary embodiment of the present invention, the peripheral device 100 can be a multi-media card (MMC) memory or other memory devices.

The peripheral device 100 further includes a bus interface 120 in addition to the controller 110, non-volatile memory 130 and smart card chip 140. The bus interface 120 is electrically connected to the controller 110 for connecting to the host 200. In the present exemplary embodiment, the bus interface 120 is an SD interface. It should be noted that the bus interface 120 can be other suitable interfaces. For example, when the peripheral device 100 is the MMC memory card, the bus interface 120 is an MMC interface.

The host 200 carries out the method for transmitting the data stream according to the exemplary embodiment of the present invention by operating the data processing unit 206 to handle the peripheral device 100. In addition, it should be noted that the host 200 also includes other components, such as a processor, an operating system, etc. In the present exemplary embodiment, all commands and data between the host 200 and the peripheral device 100 are transmitted through the cache 212. Furthermore, the host 200 can be a personal computer, a cell phone, a notebook computer, a personal digital assistant (PDA), or the like.

Figure 3:
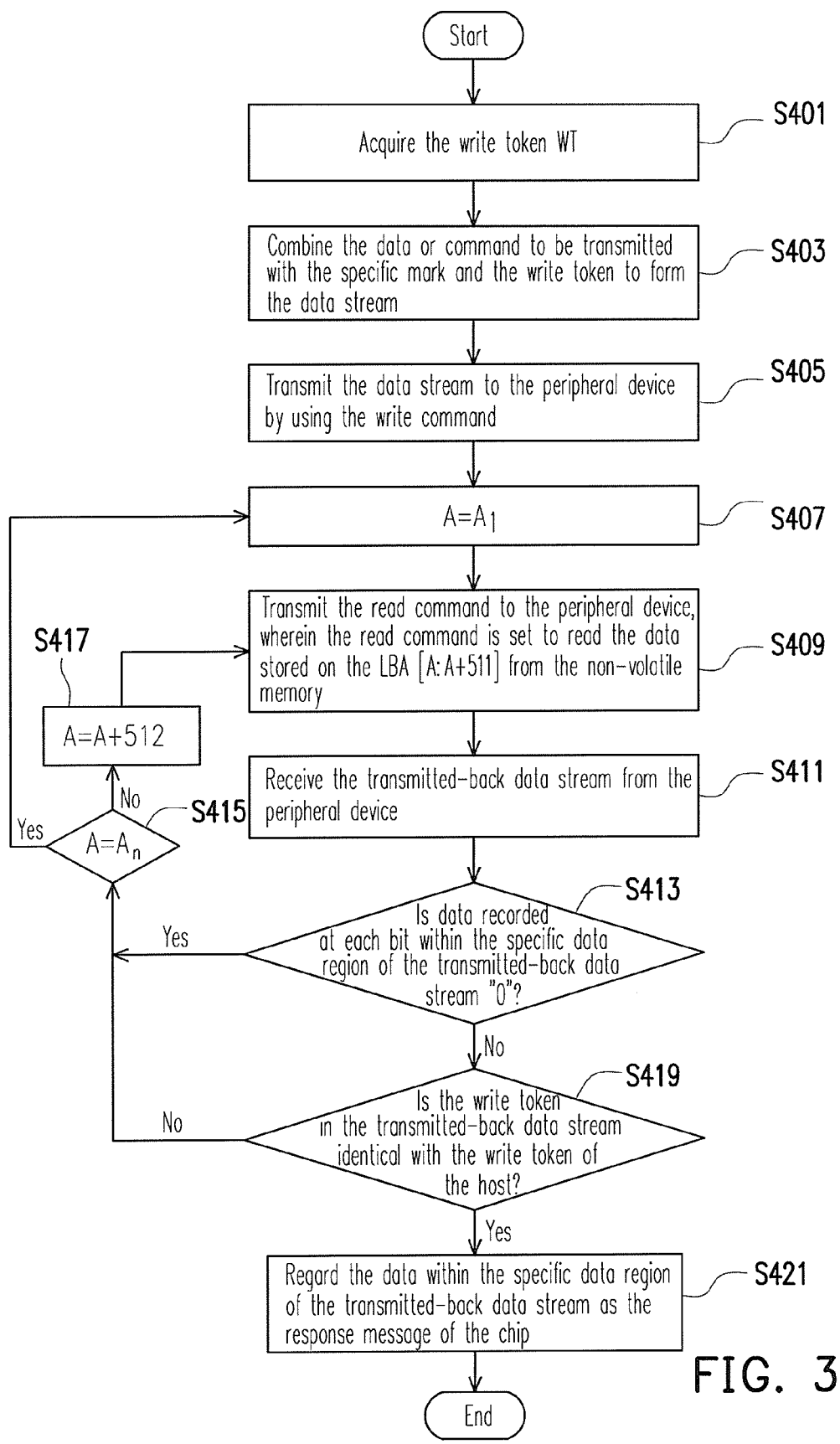
FIG. 3 is a flow chart illustrating operations of the host according to the first exemplary embodiment of the present invention.
Figure 4:
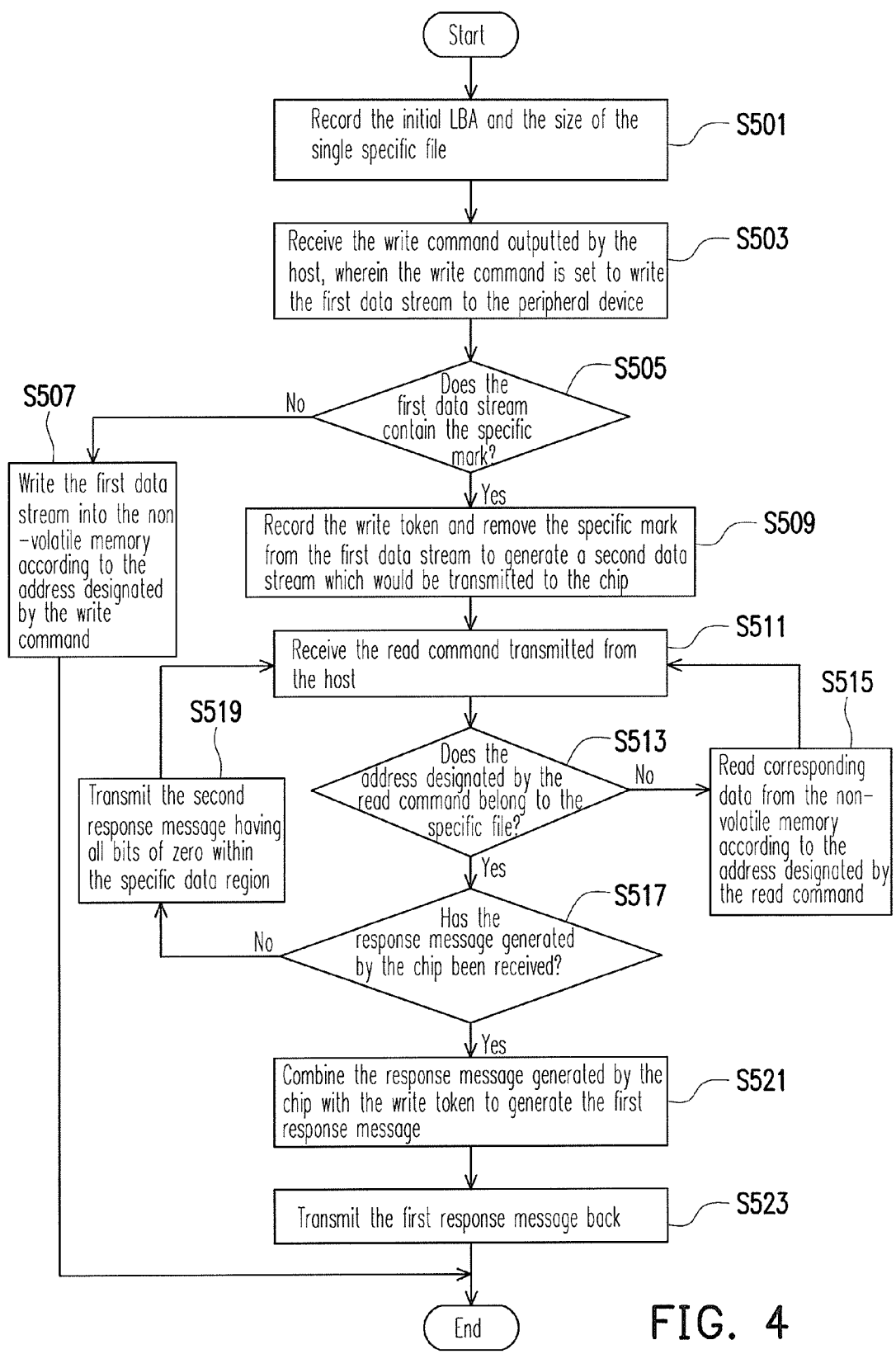
FIG. 4 is a flow chart illustrating operations of a peripheral device according to the first exemplary embodiment of the present invention.
Figure 5:
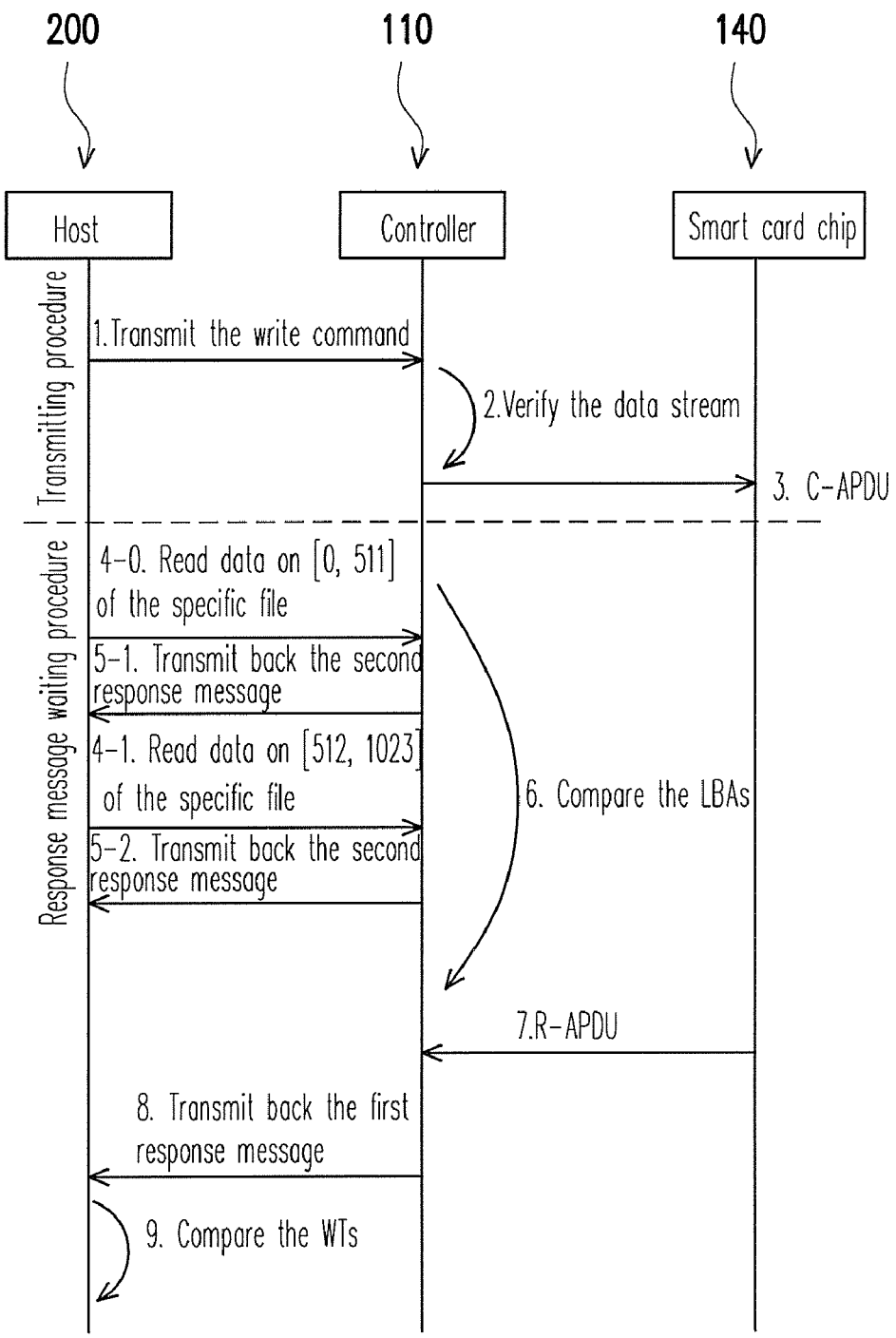
FIG. 5 is a schematic data flow diagram illustrating the operations of the first exemplary embodiment of the present invention.
Figure 6:
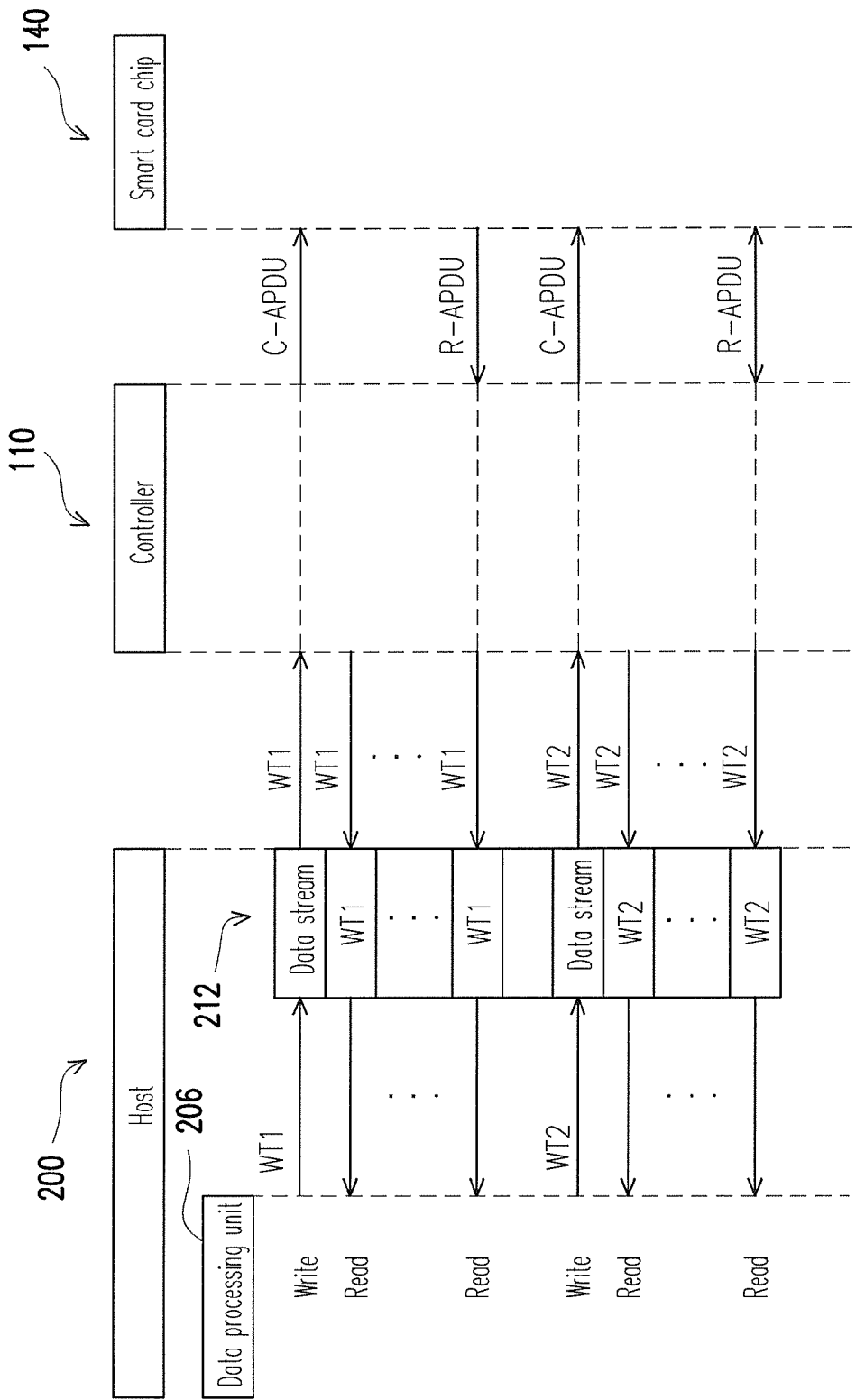
FIG. 6 illustrates the data flow direction when the host 200 communicates with the smart card chip 140 twice.

Thus, when the host 200 handles the peripheral device 100 with the smart card chip 140 as described above, according to the exemplary embodiment of the present invention, the controller 110 can cooperate with the data processing unit 206 to correctly transmit data or commands to the smart card chip 140 and inerrably transmit a response message of the smart card chip 140 back to the host 200. The procedure of transmitting and distributing data between the controller 110 and the host 200 is described below in detail with reference to FIGS. 4 to 6. FIG. 3 is a flow chart illustrating operations of the host 200 according to the first exemplary embodiment of the present invention. FIG. 4 is a flow chart illustrating operations of the peripheral device 100 according to the first exemplary embodiment of the present invention. FIG. 5 is a schematic data flow diagram illustrating the data stream. FIG. 6 illustrates the data flow direction when the host 200 communicates with the smart card chip 140 twice.

Referring to FIG. 3, before transmitting data to the smart card chip 140, the host 200 acquires or generates a write token WT, and records the write token WT (step S401). The write token WT is generated according to a predetermined principle. For instance, the write token WT may be generated sequentially, randomly, or according to a system time of the host 200. Thus, generally, every time the host 200 transmits data to the smart card chip 140, the write tokens WT acquired by the host 200 are usually different. In addition, when the host 200 transmits the write command to the smart card chip 140, the write token WT is transmitted to the controller 110 with the write command. Moreover, the write token WT could be embedded in the data stream transmitted back to the host 200. The host 200 then compares whether the write token transmitted to the controller 110 is identical with the write token transmitted back from the controller 110 to verify the accuracy of the transmitted-back data.

Figure 7:
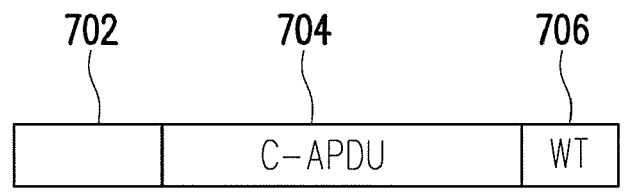
FIG. 7 illustrates the structure of the data stream used in the first exemplary embodiment.

Thereafter, before the host 200 transmits data or command to the smart card chip 140 of the peripheral device 100, the host 200 combines data or the command, that would be transmitted to the smart card chip 140, with a specific mark and the write token WT to form the data stream (step S403). Referring to FIG. 7, in the present exemplary embodiment, the data or command 704 transmitted by the host 200 to the controller 110 is a command-application protocol data unit (C-APDU). Moreover, after the C-APDU 704 combines with the specific mark 702 and a write token 706, a data stream 700 is formed for the communication between the host 200 and the smart card chip 140. However, it should be noted that in other exemplary embodiments of the present invention whose peripheral device 100 without the non-volatile memory 130, the data stream 700 may not include the specific mark 702. That is, for the exemplary embodiments without the non-volatile memory 130, the specific mark 702 does not need to be included in the data stream 700. In other words, in the exemplary embodiments without the non-volatile memory 130, when performing step S403, the data stream 700 can be formed by merely combining the C-APDU 704 and the write token 706. In the present exemplary embodiment, the specific mark 702 is located on several most significant bits (MSBs) of the data stream 700 thus appearing in the front of the C-APDU 704. The write token 706 is located on several least significant bits (LSBs) of the data stream 700 thus appearing in the rear of the C-APDU 704. However, it should be noted that the locations of the specific mark 702 and the write token 706 are not limited thereto. For instance, in another exemplary embodiment of the present invention, the bits of the specific mark 702 and the write token 706 are dispersed into the data stream 700 by using an encoder, and the same encoder is used subsequently to acquire the specific mark 702 and the write token 706 from the data stream 700. In addition, in one exemplary embodiment of the present invention, the specific mark 702 and the write token 706 are located on the same end of the data stream 700. In another exemplary embodiment of the present invention, the specific mark 702 is located on the right end of the data stream 700, and the write token 706 is located on the left end of the data stream 700.

Also, it should be noted that, in the present exemplary embodiment, if the host 200 is accessing the non-volatile memory 130 rather than the smart card chip 140, then the specific mark 702 and the write token 706 are not embedded into the data stream transmitted from the host 200 to the controller 110. It would be explained how the controller 110 determines whether the destination of its transmitted data stream is the non-volatile memory 130 or the smart card chip 140 by verifying whether the specific mark 702 is included in the received data stream.

After the data stream 700 has been formed, the host 200 transmits the data stream 700 to the controller 110 of the peripheral device 100 by using a write command (step S405). That is, the host 200 transmits the write command to the peripheral device 100, and this write command is set to write the data stream 700 into the peripheral device 100.

After the data stream 700 is transmitted to the controller 110, the host 200 sequentially transmits a plurality of read commands to the controller 110 of the peripheral device 100 until the host 200 receives the response message generated by the smart card chip 140 from the peripheral device 100. Moreover, the read commands are set to read data stored on a plurality of logical block addresses (LBA) $A_1$ to $A_N$ sequentially. In the present exemplary embodiment, the LBAs $A_1$ to $A_N$ belong to a single specific file. Referring to FIG. 3, before the read commands are transmitted to the peripheral device 100, the host 200 sets a current read address A to be an initial LBA $A_1$ (step S407). Then, the host 200 transmits one of the read commands to the peripheral device 100 (step S409), and this read command is set to read data of a predetermined length from one of the LBAs $A_1$-$A_N$. In the present exemplary embodiment, the predetermined length is 512 bytes, and the read command is set to read the data stored on LBAs A to (A+511) (that is, data of [A:A+511]) in the non-volatile memory 130. However, the present invention is not limited herein. It should be noted that, in the present exemplary embodiment, when receiving the read command outputted from the host 200, the controller 110 first determines whether the read command is set to read the data stored on the LBAs $A_1$ to $A_N$. If the read command is set to read the data stored on the LBAs $A_1$ to $A_N$, then the controller 110 directly generates a 512-bytes data in which all bytes are zeroes in a temporary register to reduce the consumed time for reading data. Furthermore, in another exemplary embodiment of the present invention, the 512-bytes data, in which all bytes are zeroes, are read from the single specific file. The single specific file exists in the non-volatile memory 130 or is disposed to a memory unit invented by the controller 110. In the present exemplary embodiment, the actual data recorded at each of the LBAs $A_1$ to $A_N$ of the non-volatile memory 130 are all zeroes; however, in another exemplary embodiment, the data stored in the LBAs $A_1$ to $A_N$ can also be a predetermined pattern.

Figure 8:
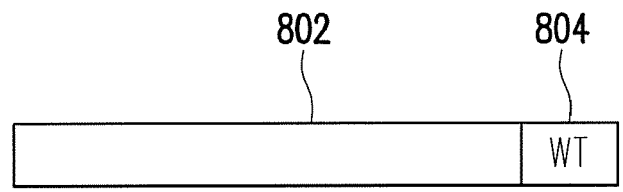
FIG. 8 illustrates the structure of the data stream transmitted back from the controller to the host in one exemplary embodiment of the present invention.

Referring to FIG. 3, when the host 200 transmits the read command to the peripheral device 100, the host 200 waits to receive the transmitted-back data stream from the peripheral device 100 (step S411). The transmitted-back data stream is generated by the micro processing unit 110a in response to receiving the read command from the host 200. Moreover, the transmitted-back data stream includes the write token WT. In detail, when the micro processing unit 110a receives the data stream 700 including the write token WT, the micro processing unit 110a temporarily stores the write token WT therein. Afterwards, when the micro processing unit 110a responds to the read command received from the host 200, the temporarily stored write token WT is then added to the transmitted-back data stream. Referring to FIG. 8, FIG. 8 is a data structural diagram of a data stream 800 transmitted back from the micro processing unit 110a to the host 200. The data stream 800 includes a specific data region 802 and a write token region 804. The specific data region 802 is used to record the message generated by the smart card chip 140 or the 512-bytes data, in which all bytes are zeroes (or the predetermined pattern). On the other hand, the write token region 804 is used to record the write token WT. As illustrated in FIG. 8, the write token region 804 is located behind the specific data region 802. However, the present invention is not limited herein. For example, in another exemplary embodiment of the present invention, the write token region 804 is located before the specific data region 802.

In the following step S413, the host 200 determines whether data recorded at each bit within the specific data region 802 of the transmitted-back data stream 800 are all zeroes, or determines whether data recorded within the specific data region 802 are the predetermined pattern. If data recorded at each bit within the specific data region 802 of the data stream 800 are all zeroes, or data recorded within the specific data region 802 are the predetermined pattern, then it means that the micro processing unit 110a of the controller 110 has not yet received the response message of the smart card chip 140, then step S415 is proceeded. On the contrary, if data recorded at each bit within the specific data region 802 of the data stream 800 are not all zeroes, it means that the micro processing unit 110a of the controller 110 may have received the response message of the smart card chip 140, then step S419 is proceeded.

In step S419, the host 200 determines whether the write token WT in the data stream 800 transmitted back from the micro processing unit 110a is identical with the write token WT temporarily stored by the host 200. If the two write tokens WT are the same, then step S421 is proceeded. If the two write tokens WT are not the same, then step S415 is proceeded. Generally, without re-initiating the data processing unit 206, the write token WT in the data stream 800 transmitted back from the micro processing unit 110a is usually identical with the write token WT temporarily stored by the host 200. Nevertheless, since the host 200 has the cache 212 and the cache 212 contains the data stream previously transmitted back from the micro processing unit 110a, when the data processing unit 206 is re-initiated such that the write token WT recorded by the host 200 has changed, it is possible that the write token WT recorded by the host 200 may be different from the write token WT of the transmitted-back data stream 800.

When the write token WT recorded by the host 200 is different from the write token WT of the transmitted-back data stream 800, even when data recorded at each bit within the specific data region 802 of the data stream 800 are not all zeroes, or data recorded within the specific data region 802 are the predetermined pattern, the host still does not regard the data within the specific data region 802 of the data stream 800 received as the response message of the smart card chip 140. For the accuracy of the data, with the comparison of the write token WT in step S419, the host 200 is prevented from erroneously regarding the previous data temporarily stored by the cache 212 as the response message generated by the smart card chip 140. For example, if it is assumed that the data processing unit 206 operated twice successively in the period between turning on and shutting off the host 200. During the first execution of the data processing unit 206, the host 200 receives the response message from the smart card chip 140 through steps S401~S421. The response message is still stored in the cache 212 after the data processing unit 206 has re-operated. In such condition, if the re-initiated data processing unit 206 does not proceed the verification in step S419 during the period of transmitting message to the smart card chip 140 and waiting for the response message of the smart card chip 140, then the host 200 may erroneously regard the previous response message temporarily stored in the cache 212 as the current response message, such that data error would occur. In other words, through the verification in step S419, the host 200 can distinguish whether the received response message is the current response message or the previous response message temporarily stored in the cache 212. Consequently, the accuracy of data greatly enhanced.

When the host 200 verifies that the received response message is the current response message, the host 200 regards the data within the specific data region 802 of the received data stream 800 is the response message of the smart card chip 140 (step S421).

It should be noted that, in another exemplary embodiment of the present invention, the order of the steps S413 and S419 are switched. That is, step S413 is executed after the execution of step S419. In the exemplary embodiment, if the two write tokens WT are determined to be different in step S419, then step S415 is performed; otherwise, step 413 is performed. Moreover, when data recorded at each bit within the specific data region 802 of the transmitted-back data stream 800 are all determined to be zeroes, step S415 is performed; otherwise, step S421 is performed.

In step S415, the host 200 determines whether the current read address A is equal to the last LBA $A_N$. If the current read address A is equal to the last LBA $A_N$, it means that the host 200 has transmitted N read commands to the peripheral device 100. At this time, the host 200 then sets the current read address A to be the initial LBA $A_1$ (step S407). Herein, the N read commands are set to read the data from the LBAs $A_1$ to $A_N$ in the non-volatile memory 130. However, if the current read address A is not equal to the last LBA $A_N$, the host 200 then adds a predetermined data length to the current read address A (step S417). In the present exemplary embodiment, the predetermined data length is 512 bytes. Therefore, in the present exemplary embodiment, the read commands generated by the host 200 are set to read the data of the same length, i.e. 512 bytes, sequentially from the LBAs $A_1$ to $A_N$. Moreover, to simplify the operations of the host 200, in another exemplary embodiment of the present invention, the host 200 acquires all the LBAs $A_1$ to $A_N$ according to the initial LBA $A_1$ and the size of the single specific file. For example, the second LBA $A_2$ equals to ($A_1$+512), the last LBA $A_N$ equals to ($A_1$+ 512×(N−1)), and the size of the single specific file equals to (512×N).

In addition, in another exemplary embodiment of the present invention, a look up table may be used to acquire all the information of the LBAs $A_1$ to $A_N$. In one exemplary embodiment, the look up table contains all the LBAs of to the specific file. However, in another exemplary embodiment, the look up table contains the first LBA and the last LBA. Herein, as the LBA is usually formed by sectors, and each sector usually has a data length of 512 bytes, thus all the LBAs $A_1$ to $A_N$ can be obtained based on the first LBA and the last LBA. Hence, in case the micro processing unit 110a determines that the address designated by the read command matches with the LBA recorded in the look up table, if the smart card chip 140 has not generate the response message, the micro processing unit 110a then transmits back the data stream having all zero bits, which are recorded at each bit within the specific data region 802, to the host 200. In addition, in another exemplary embodiment of the present invention, the peripheral device 100 operates without actually storing data on the LBAs $A_1$ to $A_N$. That is, the specific file may be a virtual file.

When the micro processing unit 110a determines that the address designated by the read command belongs to the LBAs $A_1$ to $A_N$, the micro processing unit 110a then directly generates the response message and transmits the response message to the host 200 so as to omit the procedure of reading the specific file. It should be noted that the predetermined data length in the present invention is not limited to 512 bytes and could be other values, such as 4K bytes, 8K bytes, etc. Additionally, in the present exemplary embodiment, each read command is set to read data of the predetermined data length and, therefore the predetermined data length can be adjusted to meet different demands. For example, the predetermined data length can be shortened so that the data amount of the data stream transmitted back from the micro processing unit 110a of the controller 110 in response to each read command can be reduced. Consequently, the responding time of the micro processing unit 110a is shortened and the efficiency of the controller 110 is enhanced.

Corresponding to the procedure of the operations of the host 200 illustrated in FIG. 3 and the smart card chip 140, the operations of the peripheral device 100 and the host 200 can refer to the procedure as shown in FIG. 4. Firstly, when the peripheral device 100 starts to operate, the micro processing unit 110a of the controller 110 records the initial LBA $A_1$ and the size of the single specific file (step S501) that can be used when subsequently a comparison is made with the read command generated by the host 200. However, in another exemplary embodiment of the present invention, prior to recording the initial LBA $A_1$ and the size of the single specific file, the micro processing unit 110a determines whether the single specific file is stored in the non-volatile memory 130. If the single specific file does not exist in the non-volatile memory 130, the micro processing unit 110a then creates the single specific file in the non-volatile memory 130 or disposes the single specific file to a virtual memory unit.

After the initial LBA $A_1$ and the size of the single specific file have been recorded, the controller 110 then starts receiving the write command from the host 200 (step S503). The received write command is set to write the first data stream into the peripheral device 100, and the first data stream can be the data stream 700 shown in FIG. 7 or other data streams. After receiving the write command, the controller 110 then determines whether the first data stream has the specific mark 702 as illustrated in FIG. 7 (step S505). If the first data stream does not have the specific mark 702, then the micro processing unit 110a of the controller 110 writes the first data stream into the non-volatile memory 130 according to the address designated by the write command (step S507). On the contrary, if the first data stream has the specific mark 702, the micro processing unit 110a of the controller 110 then records the write token WT (such as the write token in FIG. 7) embedded in the first data stream into the buffer 110c. Afterwards, the specific mark 702 and the write token WT are removed from the first data stream to produce a second data stream (such as the C-APDU 704 illustrated in FIG. 7). The second data stream is then transmitted to the smart card chip 140 (step S509). Hence, by verifying whether the first data stream has the specific mark 702, the micro processing unit 110a of the controller 110 can determine if the data stream is to be transmitted to the non-volatile memory 130 or to the smart card chip 140. It should be noted that in another exemplary embodiment without the non-volatile memory 130 in the present invention, since the data stream 700 does not have the specific mark 702, the steps S505 and S507 in the flow chart of FIG. 4 are omitted. Moreover, the specific mark 702 does not need to be removed from the data stream 700 in the step S509, instead, at least a portion of the data stream 700 is directly transmitted to the smart card chip 140. It should be noted that in another exemplary embodiment of the present invention, the second data stream is the first data stream. In other words, the micro processing unit 110a does not remove the specific mark 702 or the write token WT from the first data stream. Instead, the first data stream is directly transmitted to the smart card chip 140 by the micro processing unit 110a. Afterwards, the smart card chip 140 identifies the specific mark 702, the C-APDU 704, and the write token WT in the received first data stream. In addition, in the present exemplary embodiment, the write token WT embedded in the first data stream is recorded in the buffer 110c as described above. In another exemplary embodiment of the present invention, the micro processing unit 110a records the write token WT embedded in the first data stream into the non-volatile memory 130.

After the second data stream is transmitted to the smart card chip 140, the micro processing unit 110a of the controller 110 then waits for receiving the read command transmitted from the host 200 (step S511). The read command includes, but is not limited to the read command transmitted by the host 200 in step S409 of FIG. 3. Next, the micro processing unit 110a of the controller 110 determines whether the address designated by the received read command belongs to the single specific file (step S513). That is, the micro processing unit 110a determines whether the received read command is set to read data stored on the LBAs $A_1$ to $A_N$. If the address designated by the read command does not belong to the single specific file, then the micro processing unit 110a reads the corresponding data according to the address designated by the read command (step S515) and transmits the data to the host 200. On the contrary, if the address designated by the read command belongs to the single specific file, then the micro processing unit 110a determines whether the response message of the smart card chip 140 has been received (step S517). Moreover, in the present exemplary embodiment, the response message is generated by the smart card chip 140 in response to receiving of the aforementioned second data stream. The response message is a response-application protocol data unit (R-APDU). In step S517, if the micro processing unit 110a has received the response message of the smart card chip 140, then the micro processing unit 110a combines the response message generated by the smart card chip 140 and the write token WT recorded within the buffer 110c (or within the non-volatile memory 130) into a first response message (step S521). Next, the first response message is transmitted back to the host 200 (step S523). The data structure of the first response message aforementioned and the data structure of the data stream 800 illustrated in FIG. 8 are the same. Herein, the specific data region 802 is used to record the response message generated by the smart card chip 140. The write token region 804 is used to record the write token WT.

If the micro processing unit 10a has not received the response message of the smart card chip 140 in the step S517, then the micro processing unit 110a of the controller 110 transmits a second response message to the host 200 in response to the read command received (step S519). In the present exemplary embodiment, the data structure of the second response message is also identical with the data structure of the data stream 800 as illustrated in FIG. 8. Herein, the data recorded at each bit within the specific data region 802 are all zeroes, and the write token region 804 is used to record the write token WT. It should be noted that in another exemplary embodiment of the present invention, if the micro processing unit 110a has not received the response message of the smart card chip 140 in step S517, the micro processing unit 110a then transmits data with all bits of zero to the host 200 in step S519. That is, the second response message transmitted back to the host 200 does not have the write token WT. After step S519 has been performed, the micro processing unit 110a then waits for the next read command of the host 200 until the response message generated by the smart card chip 140 has been received and the first response message is transmitted back to the host 200.

As described above, the data stream transmission between the host 200 and the storage device 100 generally includes a transmitting procedure and a response message waiting procedure, as illustrated in FIG. 5. During the transmitting procedure, the host 200 transmits the write command to the controller 110 (similar to steps S403 and S405 in FIG. 3). Next, the controller 110 determines whether the received data stream has the specific mark (similar to step S505 in FIG. 4). If the data stream received has the specific mark, the controller 110 then records the write token WT embedded in the data stream and transmits the C-APDU of the data stream to the smart card chip 140 (similar to step S509 in FIG. 4). Moreover, during the response message waiting procedure, if the smart card chip 140 has not generated the response message (i.e. R-APDU), then the host 200 sequentially transmits the read commands to the controller 110 and receives the second response message transmitted back from the controller 110 (similar to step S407 to S417 in FIG. 3). On the other hand, the controller 110 compares the address designated by the read command with the LBAs $A_1$ to $A_N$ to determine if the addresses match and transmits back the second response message to the host 200 (similar to steps S511 to S519 in FIG. 4). Afterwards, after receiving the response message generated by the smart card chip 140, the controller 110 then transmits the aforementioned first response message to the host 200 (similar to steps S521 and S523 in FIG. 4). Furthermore, the host 200 compares the write token embedded in the received first response message with the write token recorded in the host 200 to determine if the write tokens are the same (similar to step S419 in FIG. 3). Finally, when the write token embedded in the first response message and the write token recorded by the host 200 are the same, the host 200 then regards the data within the specific data region 802 of the first response message received as the response message generated by the smart card chip 140 (similar to step S421 in FIG. 3).

Additionally, as illustrated above, each time before the host 200 transmits data to the smart card chip 140, the host 200 first acquires one of the write tokens WT, and the write tokens acquired by the host 200 are usually different. Referring to FIG. 6, each time when transmitting the data to the smart card chip 140, the host 200 adds the write token WT to the data stream that would be transmitted. Next, the data stream having the write token WT is then transmitted to the controller 110 by using the write command. As illustrated in FIG. 6, when the host 200 successively transmits the data streams to the smart card chip 140, the two write tokens are different from each other. Herein, a write token WT1 is acquired during the previous transmission, and a write token WT2 is acquired during the latter transmission. When the controller 110 receives write data streams from the host 200, the controller 110 successively stores the write tokens WT1 and WT2 embedded in the received data streams temporarily. When the controller 110 receives the data stream having the write token WT2, the stored write token WT1 is then replaced by the latter write token WT2. Moreover, when the controller 110 receives the response messages of the smart card chip 140 (i.e. R-APDU), the controller 110 adds the write tokens WT1 or WT2 into the transmitted-back response messages. Hence, by comparing the write tokens stored in the host 200 and in the response messages, the host 200 can determine whether the received response message is the response message generated by the smart card chip 140 in response to the specific write command.

In addition, in the illustrated exemplary embodiment, the write address of the memory that is designated by the write command in step S405 of FIG. 3 is different from the read address of the memory that is designated by the read command in step S409 of FIG. 3. Therefore, when the host 200 transmits the read command to the controller 110, the host 200 in FIG. 2 does not identify the data stream, which is written into the peripheral device 100 and stored in the cache 212 according to the write command, as the cached data that would be transmitted back to the host 200. Moreover, in the present exemplary embodiment, the data amount of the single specific file is greater than or equal to the size of the cache 212. Since each read command transmitted by the host 200 is to read data stored on a different LBA, when the cached data stored in the cache 212 are gradually replaced by new cached data, the response messages stored in the cache 212 are updated continuously such that the cache 212 stores the newest response messages. Thus, the cache 212 is prevented from transmitting erroneous response message to the host 200. This can prevent the cache 212 from transmitting an erroneous response message to the data processing unit 206. Thus, the response message generated by the smart card chip 140 can be inerrably transmitted back to the host 200.

[Second Exemplary Embodiment]

Figure 9:
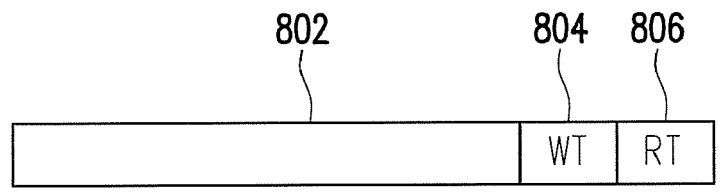
FIG. 9 illustrates the structure of the data stream transmitted back from the controller to the host in another exemplary embodiment of the present invention.

In another exemplary embodiment of the present invention, a read token is added by the controller 110 to the response message transmitted back to the host 200 to further ensure that the host 200 can still accurately determine whether the response message generated by the smart card chip 140 has been received even when a collision of the write tokens occurs. Referring to FIG. 9, FIG. 9 illustrates a structure of a data stream 900 transmitted back from the controller 110 to the host 200 in another exemplary embodiment of the present invention. In addition to the specific data region 802 and the write token region 804 of the data stream 800, the data stream 900 further has a read token region 806. The read token region 806 is used to record a read token RT generated by the micro processing unit 110a of the controller 110. Moreover, the functions of the specific data region 802 and the write token region 804 are the same as illustrated above and thus not repeated herein. Although the read token region 806 is located after the write token region 804 as illustrated in FIG. 9, the present invention is not limited thereto. For example, the locations of the write token region 804 and the read token region 806 on the data stream 900 can be exchanged. On the other hand, the write token region 804 and the read token region 806 can each locate on the two ends or on the same end of the data stream 900.

Figure 10:
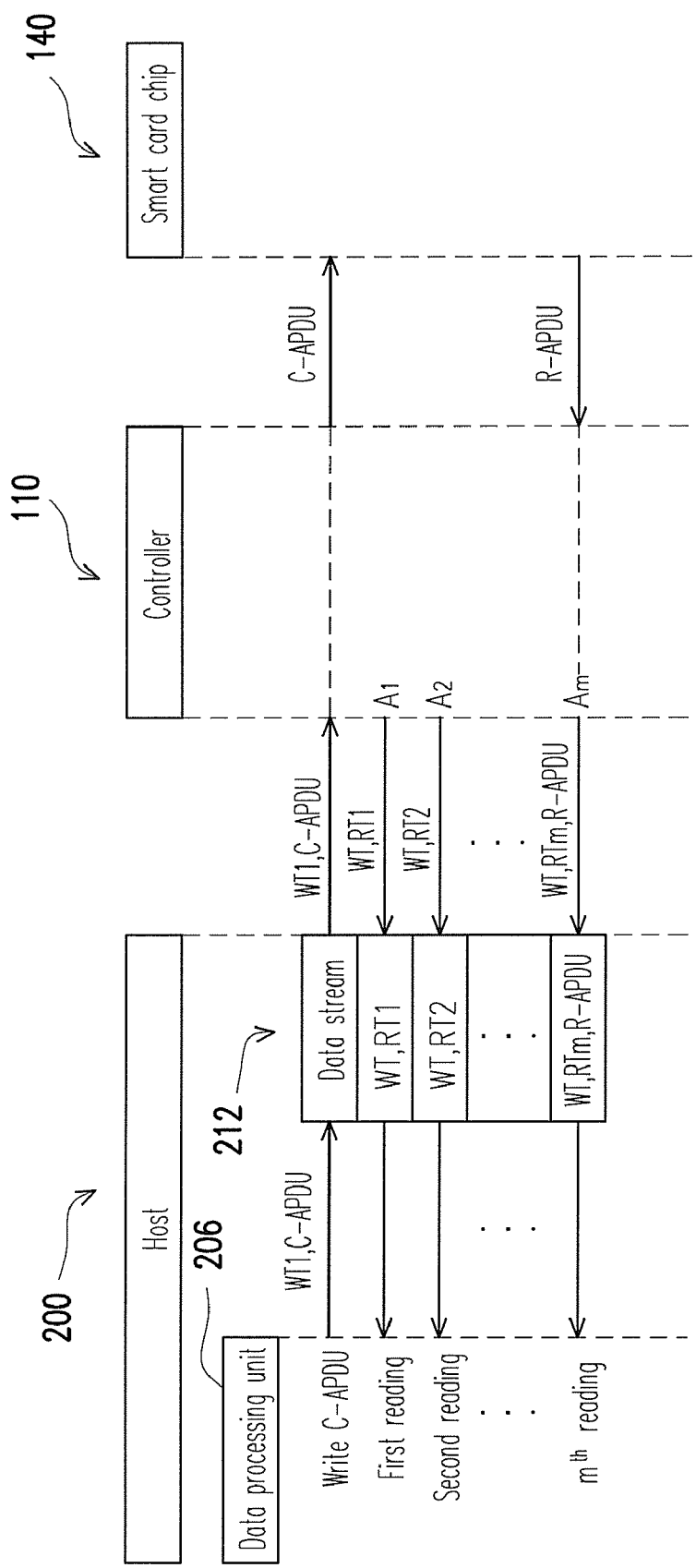
FIG. 10 illustrates the data flow direction of the write tokens and the read tokens when the host communicates with the smart card chip.

Referring to FIG. 10, FIG. 10 illustrates the data flow direction of the write tokens WT and the read tokens RT when the host 200 communicates with the smart card chip 140. Similar to the previous exemplary embodiment, the host 200 also adds the acquired write token WT to the data stream that would be transmitted to the controller 110. The controller 110 then temporarily stores the write token WT received from the host 200. In the present exemplary embodiment, when responding to the read command transmitted by the host 200, the controller 110 not only adds the stored write token WT to the response message, but also generates a read token RT according to a predetermined rule and adds the generated read token RT to the response message. As illustrated in FIG. 10, when the host 200 communicates with the smart card chip 140, the host 200 first transmits a write command, and then transmits the read commands sequentially. Similar to the previous exemplary embodiment, the write command is set to write the data stream 700 into the peripheral device 100 so as to transmit the write token WT to the controller 110 and transmit the C-APDU 704 of the data stream 700 to the smart card chip 140. Also, the plurality of read commands are set to read the data stored on the LBAs $A_1$ to $A_N$ of the single specific file sequentially. In the present exemplary embodiment, after receiving the write data stream having the write token WT, the controller 110 resets the read token RT. Herein, the read token RT can be of a specific pattern, and every time the read token RT has been reset, the pattern changes. Hence, by analyzing whether the read token RT in the transmitted-back data stream consists with the specific pattern, the host 200 can determine if the transmitted-back data stream is the previous data stream temporarily stored in the cache 212 or a new data stream generated by the controller 110. In detail, if the read token RT in the transmitted-back data stream consists with the specific pattern and the write token WT therein is identical with the write token temporarily stored in the host 200, the host 200 then regards the transmitted-back data stream as the new data stream generated by the controller 110. On the other hand, if the read token RT in the transmitted-back data stream does not consist with the specific pattern, or the write token WT therein is different from the write token temporarily stored by the host 200, the host 200 then identifies the transmitted-back data stream as the previous cached data stream stored in the cache 212.

In another exemplary embodiment of the present invention, the setting of the read token RT can be executed as the following. When the controller 110 receives the write data stream having the specific mark 702 and the write token WT, the controller 110 then initializes the initial value of the read token RT. In other words, every time the initial value of the read token RT has been reset, the initial value of the currently-reset read token is different from the initial value of the read token RT previously reset. Afterwards, when the controller 110 receives any one of the read commands set to read the specific file, the controller 110 then updates the value of the read token RT according to a predetermined rule, and adds the updated read token RT to the transmitted-back data stream 900. For example, in one exemplary embodiment of the present invention, the initial value of the read token RT is set to zero, and every time the controller 110 receives any one of the read commands set to read the specific file, the read token RT is increased by one. In the illustration accompanied with FIG. 10, a first read token RT1 is equal to one, and a second read token RT2 is equal to two, . . . , etc. It should be noted that the value to be accumulated to the read token RT can be other values in other exemplary embodiments of the present invention, such that any two read tokens RT in the response messages consecutively transmitted back to the host 200 all have the difference of a predetermined value. In the present exemplary embodiment, if the difference between any two read tokens RT in the response messages, which are consecutively transmitted back to the host 200, are equals to the aforementioned predetermined value, and the write token WT therein is identical with the write token temporarily stored by the host 200, the host 200 regards the transmitted-back data stream as a new data stream generated by the controller 110. On the other hand, if the difference between any two read tokens RT in the response messages, which are consecutively transmitted back to the host 200, are not equal to the aforementioned predetermined value, or the write token WT therein is different from the write token temporarily stored by the host 200, the host 200 then regards the transmitted-back data stream as the previous cached data stream temporarily stored in the cache 212.

Figure 11:
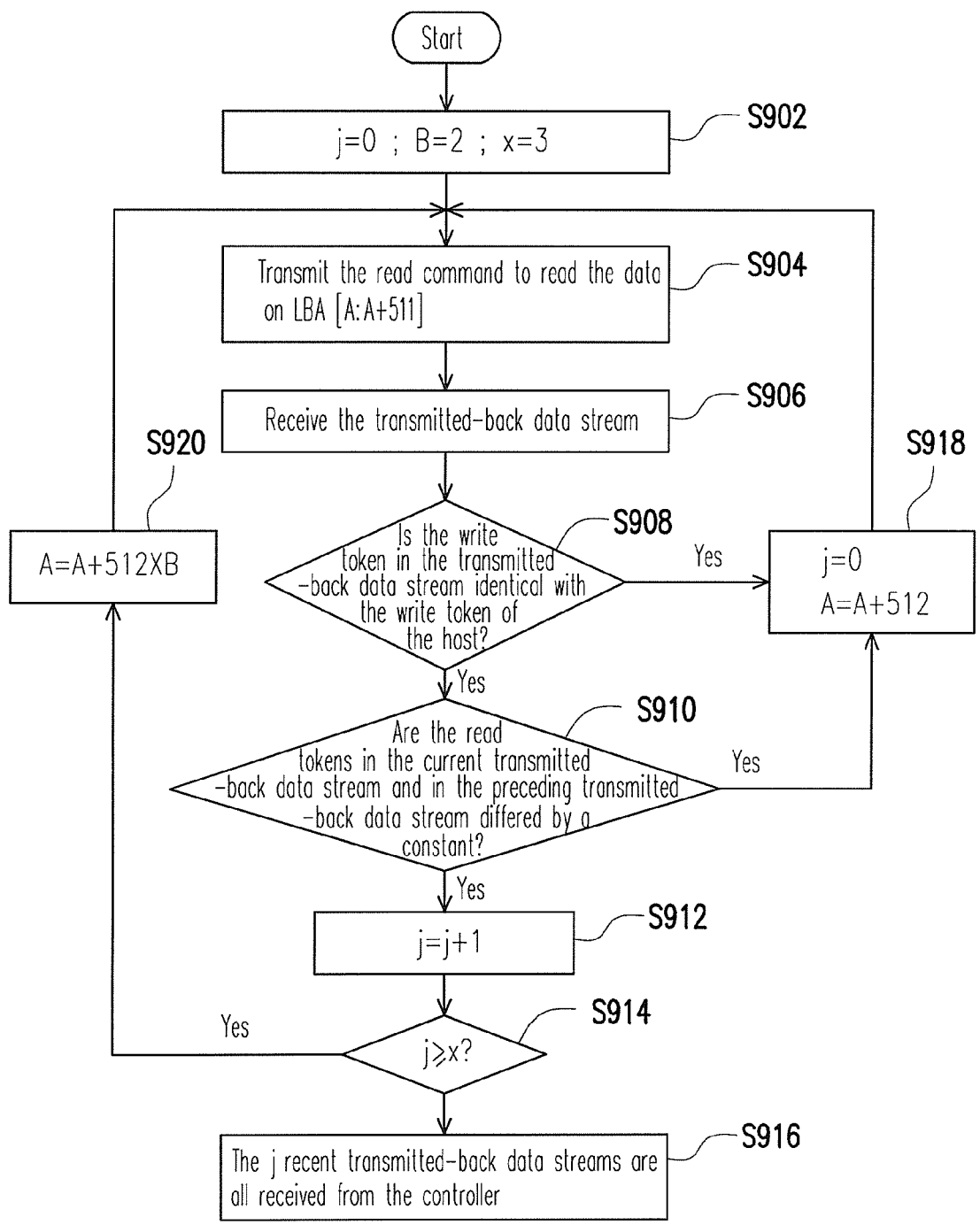
FIG. 11 is a flow chart of the host determining whether the response message received was generated by the smart card chip in one exemplary embodiment of the present invention.

In another exemplary embodiment of the present invention, to further ensure the response message generated by the smart card chip 140 can be received accurately, the host 200 not only determines if the difference between the consecutively-received response messages is equal to the predetermined value, but also determines if the differences between the read tokens RT embedded in the consecutively-received response messages of at least a predetermined number are a constant. Moreover, when both the write token WT and the read token RT have passed the determination, the LBA to be read in the next read operation and the latest LBA has been read are spaced by a plurality of logical blocks. Referring to FIG. 11, FIG. 11 is a flow chart of the host 200 determining whether the received response message was generated by the smart card chip 140 or not. Firstly, in step S902, the host 200 sets variables j, B, and x for the following processes. Herein, the variable j is used to record the current number of times that both the write token WT and the read token RT pass the examination. The variable x is used to set the number of times that the examination has been consecutively passed. The variable B is used to set the multiple of spacing of the LBAs for each reading. In the present exemplary embodiment, the variables j, B, and x are set to be zero, two, and three respectively. However, the present invention is not limited thereto. After the variables j, B, and x have been set in step S904, the host 200 transmits the read command to the controller 110 to read the data stored on the LBAs A to (A+511) (that is, the data of [A:A+511]) and wait to receive the transmitted-back data stream. When the host 200 receives the transmitted-back data stream in step S906, the host 200 determines if the write token WT in the transmitted-back data stream is identical with the write token temporarily stored therein. If the write token WT in transmitted-back data stream is different from the write token temporarily stored in the host 200, then the variable j is reset to zero, and the current LBA A is increased by a length of 512 bytes to set the next LBA to be read (step S918). If the write token WT in the transmitted-back data stream is identical with the write token temporarily stored within the host 200, then the host 200 performs step S910 to determine whether the read token RT in the current transmitted-back data stream and the read token in the preceding transmitted-back data stream are differed by a constant. Herein, the constant can be any value, and in the present exemplary embodiment, the constant is the integer 1. If the difference between the read tokens RT in the current transmitted-back data stream and in the preceding transmitted-back data stream does not equal to the constant, or if the current transmitted-back data stream is the first transmitted-back data stream such that no previous transmitted-back data stream is present, then the host 200 performs step S918 to set the next LBA to be read and resets the variable j to zero. However, if the difference between the read tokens RT in the current transmitted-back data stream and in the preceding transmitted-back data stream is equal to the constant, then the host 200 increases the variable j by one (step S912). Thereafter, the host 200 determines whether the current value of the variable j is greater than or equal to the value of the variable x (step S914). If the variable j is smaller than the variable x, then the host 200 increases the current LBA A by a length of (512×B) bytes (step S920) to set the next LBA to be read. Moreover, since B is greater than 1, the next LBA to be read and the latest-read LBA are spaced by a plurality logical blocks. In the present exemplary embodiment, the size of each logical block is 512 bytes. However, in step S914, if the host 200 determines that the variable j is greater than or equal to the variable x, it means that the differences between the read tokens RT in at least x response messages (that is, three response messages), which are received consecutively by the host 200, are all equal to the constant. Thereafter, the host 200 regards the j recent transmitted-back data streams as data streams newly generated by the controller 110 (step S916). Thus, in the present exemplary embodiment, when the times that both the write token WT and the read token RT pass the examination consecutively is greater than or equal to the variable x, the transmitted-back data stream is regarded as the data stream newly generated by the controller 110. Moreover, it should be noted that if the address of the LBA A after the accumulation in step S920 exceeds the largest LBA $A_N$, then the LBA A would be adjusted by subtracting the size of the specific file, or the LBA A is directly set as the first LBA $A_1$, such that the LBA A would be one of the LBAs $A_1$ to $A_N$. In the present exemplary embodiment, the increased byte length of the current LBA A is an integral multiple (that is, one time or B times) of the size of each logical block (i.e. 512 bytes). However, it should be noted that, in the present invention, the size of each logical block is not limited to 512 bytes. The size of each logical block can also be other values, such as 4K bytes, 8K bytes, etc.

[Third Exemplary Embodiment]

Figure 12:
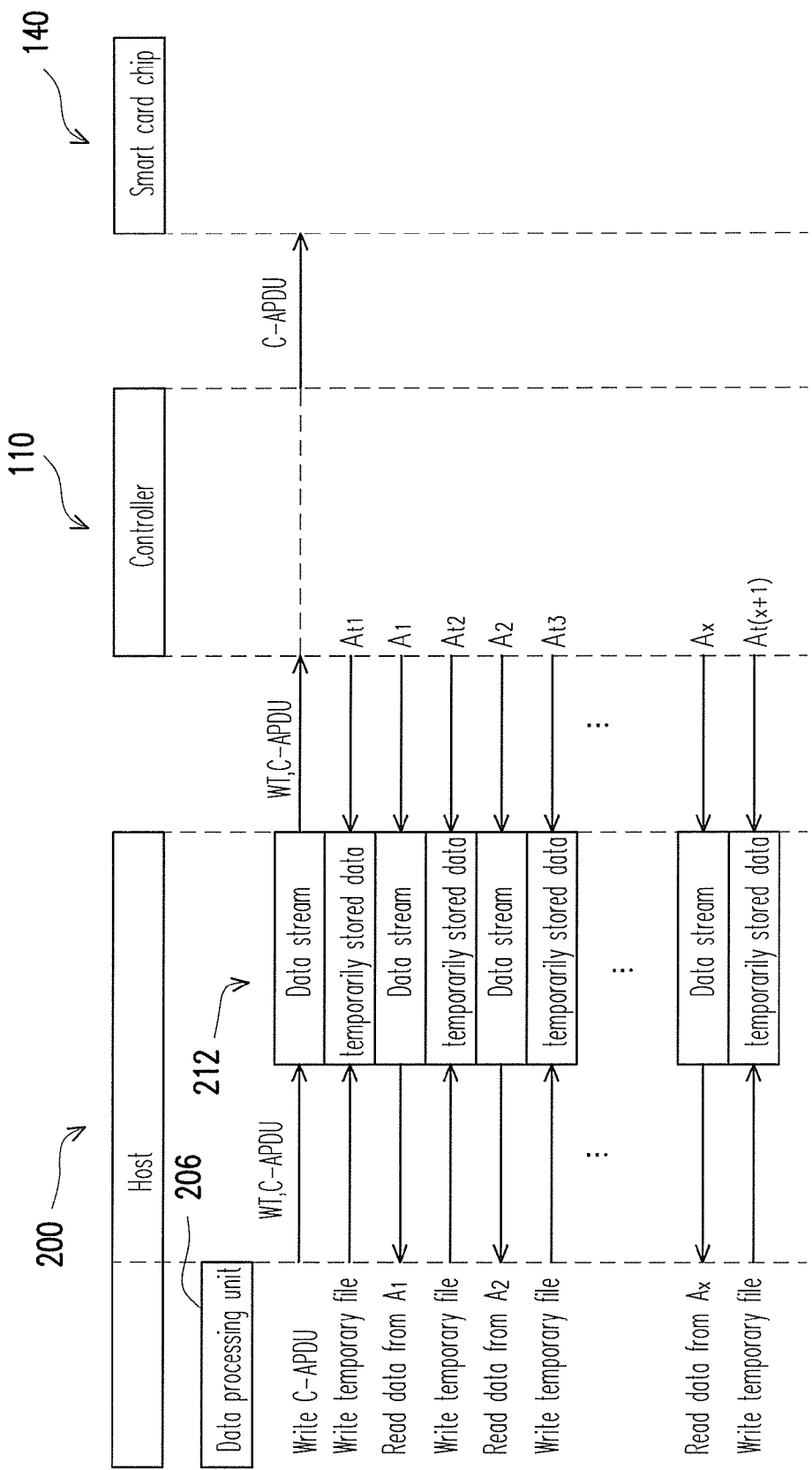
FIG. 12 illustrates the data flow direction when transmitting the data stream in the third exemplary embodiment of the present invention.
Figure 13:
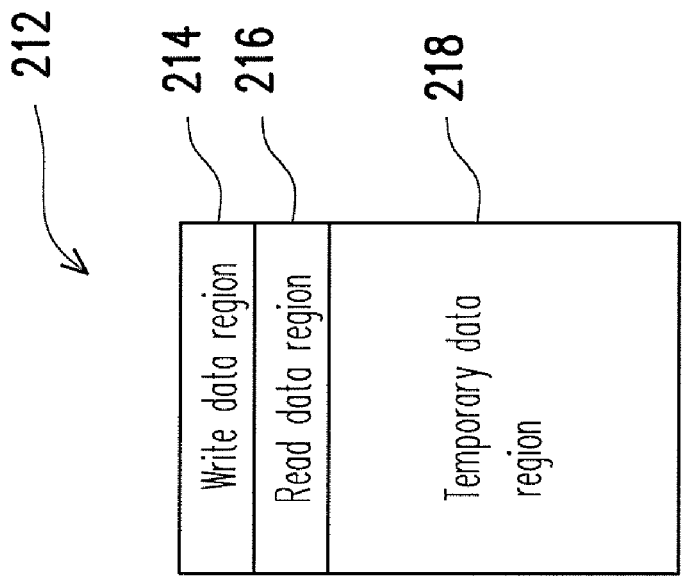
FIG. 13 illustrates space allocation of the cache in FIG. 2.

With reference to FIG. 2, in the third exemplary embodiment of the present invention, in order to eliminate the previous cached data streams from the cache 212 more efficiently and receive the new data streams transmitted from the controller 110 more rapidly, each time after transmitting any one of the read commands to the peripheral device 100 to read the data stored on the LBAs $A_1$ to $A_N$, the host 200 further executes another write command to write the data into a temporary file 112 of the peripheral device 100. In the present exemplary embodiment, the temporary file 112 is disposed in the buffer 110c. In another exemplary embodiment of the present invention, the temporary file 112 is disposed in the non-volatile memory 130. Please refer to FIGS. 12 and 13. FIG. 12 illustrates the data flow direction when transmitting the data stream according to the third exemplary embodiment of the present invention, and FIG. 13 illustrates space allocation of the cache 212. In the present exemplary embodiment, every time after the host 200 transmits any one of the read commands to the peripheral device 100 to read the data stored on the LBAs $A_1$ to $A_N$, the host 200 then further executes the write command to write data into the temporary file 112 of the peripheral device 100. Furthermore, in another exemplary embodiment of the present invention, after the host 200 transmits the data stream 700 to the controller 110 by using the write command, the host 200 then executes another write command to write data into the temporary file 112. As illustrated in FIGS. 2, 12 and 13, each time after the host 200 transmits the data stream 700 to the controller 110 by using the write command, and after the host 200 transmits the read commands to read data from the LBAs $A_1$ to $A_x$ (herein, $A_x$ belongs to one of $A_1$ to $A_N$), the host 200 executes write commands to write data into the LBAs $A_{t1}$ to $A_{t(x+1)}$ of the temporary file 112. Moreover, due to the presence of the cache 212, the data written into the temporary file 112 is also temporarily stored in the cache 212. As illustrated in FIG. 13, a temporary data region 218 of the cache 212 temporarily stores the data written into the temporary file 112. In addition, the data streams which are transmitted back to the host 200 by the controller 110 in response to the read commands received from the host 200 are temporarily stored in a read data region 216 of the cache 212. On the other hand, the data streams which are transmitted to the controller 110 by the host 200 are temporarily stored in the write data region 214 of the cache 212. Since the data stored temporarily in the temporary data region 218 produce an exclusion effect, when the size of temporary file 112 gradually increases, the space for allocating the write data region 214 and the read data region 216 gradually decreases. Additionally, since the response message generated by the smart card chip 140 is embedded in the transmitted-back data stream to the host 200, when the space for allocating the read data region 216 decreases, the possibility that the transmitted-back data stream received by the host 200 is the previous cached data stream in the cache 212 would be decreased. In the other hand, the possibility that the transmitted-back data stream received by the host 200 is a new data stream received from the controller 110 would be increased, such that the host 200 can eliminate the previous cached data streams from the cache 212 more efficiently and receive the new data streams from the controller 110 more rapidly. Besides, in another exemplary embodiment of the present invention, when the size of the temporary file 112 exceeds a predetermined data amount, the host 200 transmits a command to the controller 110 to clean the data in the temporary file 112. For example, it is assumed that the size of the cache 212 is 2048K bytes. In order to prevent the over-expanded temporary data region 218 from affecting the communications between the host 200 and the controller 110, the host 200 transmits the command to clean the temporary file 112 when the data amount of the temporary file 112 is larger than 1920K bytes, such that the space for allocation of the temporary data region 218 in the cache 212 is reconfigured. Obviously, the foregoing is merely an exemplary instance, the size of the cache 212 and the timing to clean the temporary file 112 are not limited thereto.

[Fourth Exemplary Embodiment]

As described in the first exemplary embodiment, the read commands that the host 200 transmits to the peripheral device 100 are set to read the data stored on the LBAs $A_1$ to $A_N$ of the single specific file. Differently, in the fourth exemplary embodiment of the present invention, the read commands that the host 200 transmits to the peripheral device 100 are set to read the data stored on a plurality of LBAs $B_1$ to $B_N$ of a plurality of specific files $F_1$ to $F_N$ that are stored in the non-volatile memory 130. In addition, in another exemplary embodiment of the present invention, the peripheral device 100 operates without actually storing data on the LBAs $B_1$ to $B_N$. That is, the specific files $F_1$ to $F_N$ can be virtual files. When the addresses designated by the read commands are determined to belong to the LBAs $B_1$ to $B_N$, the micro processing unit 110a then directly generates the response message and transmits the response message to the host 200 so as to omit the procedure of reading the non-volatile memory 130.

Figure 14:
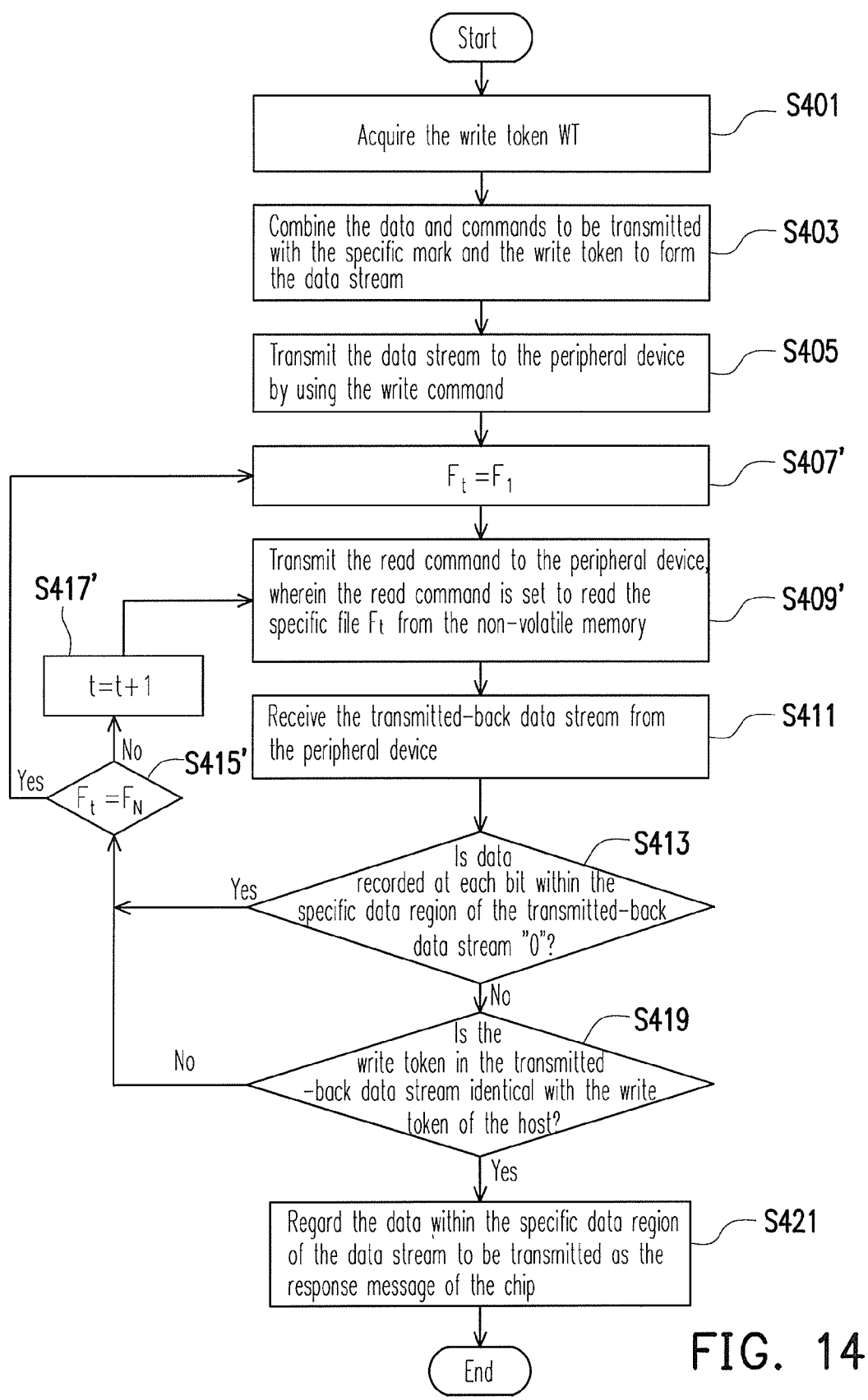
FIG. 14 is a flow chart illustrating the operations of the host according to the fourth exemplary embodiment of the present invention.
Figure 15:
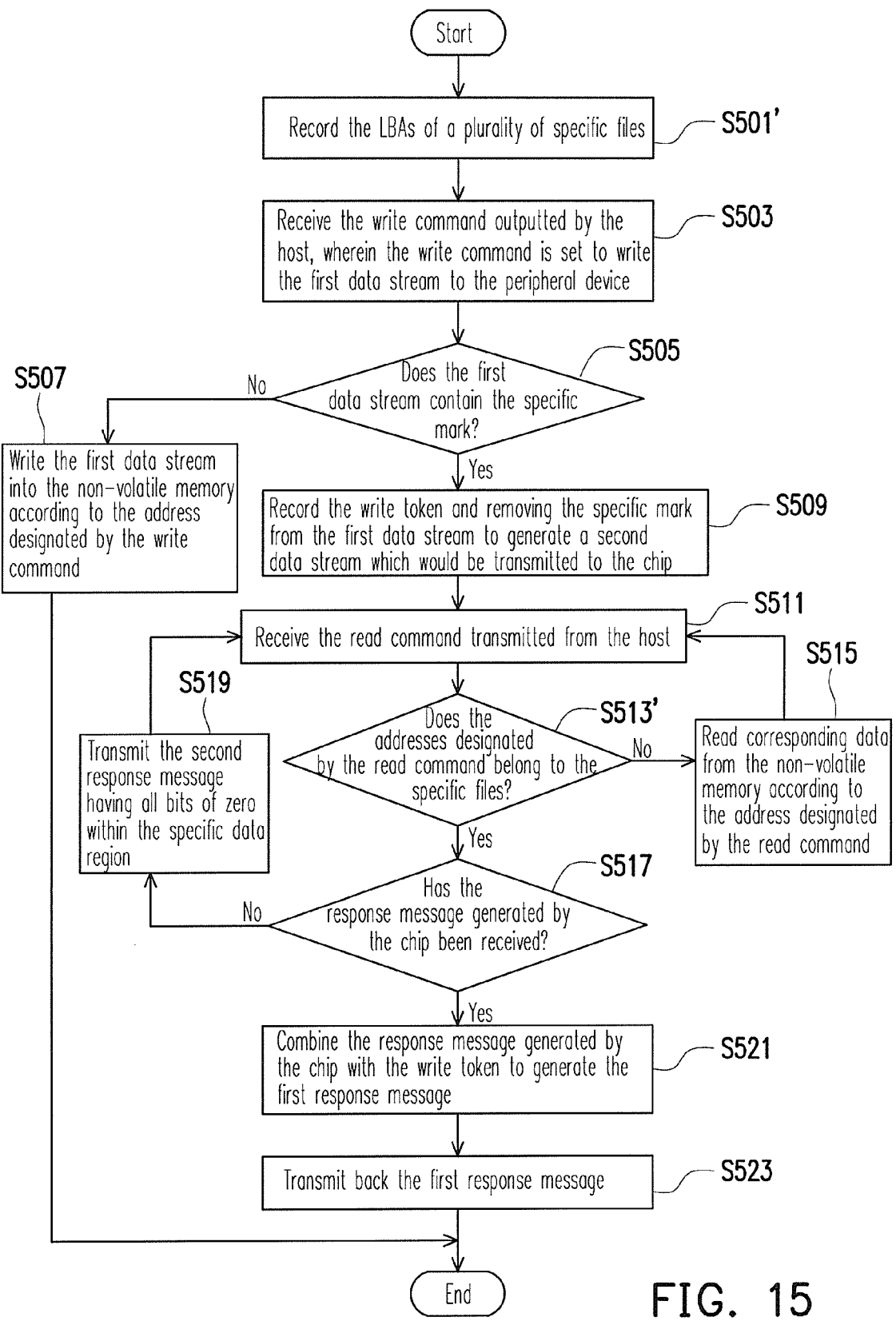
FIG. 15 is a flow chart illustrating the operations of the peripheral device according to the fourth exemplary embodiment of the present invention.
Figure 16:
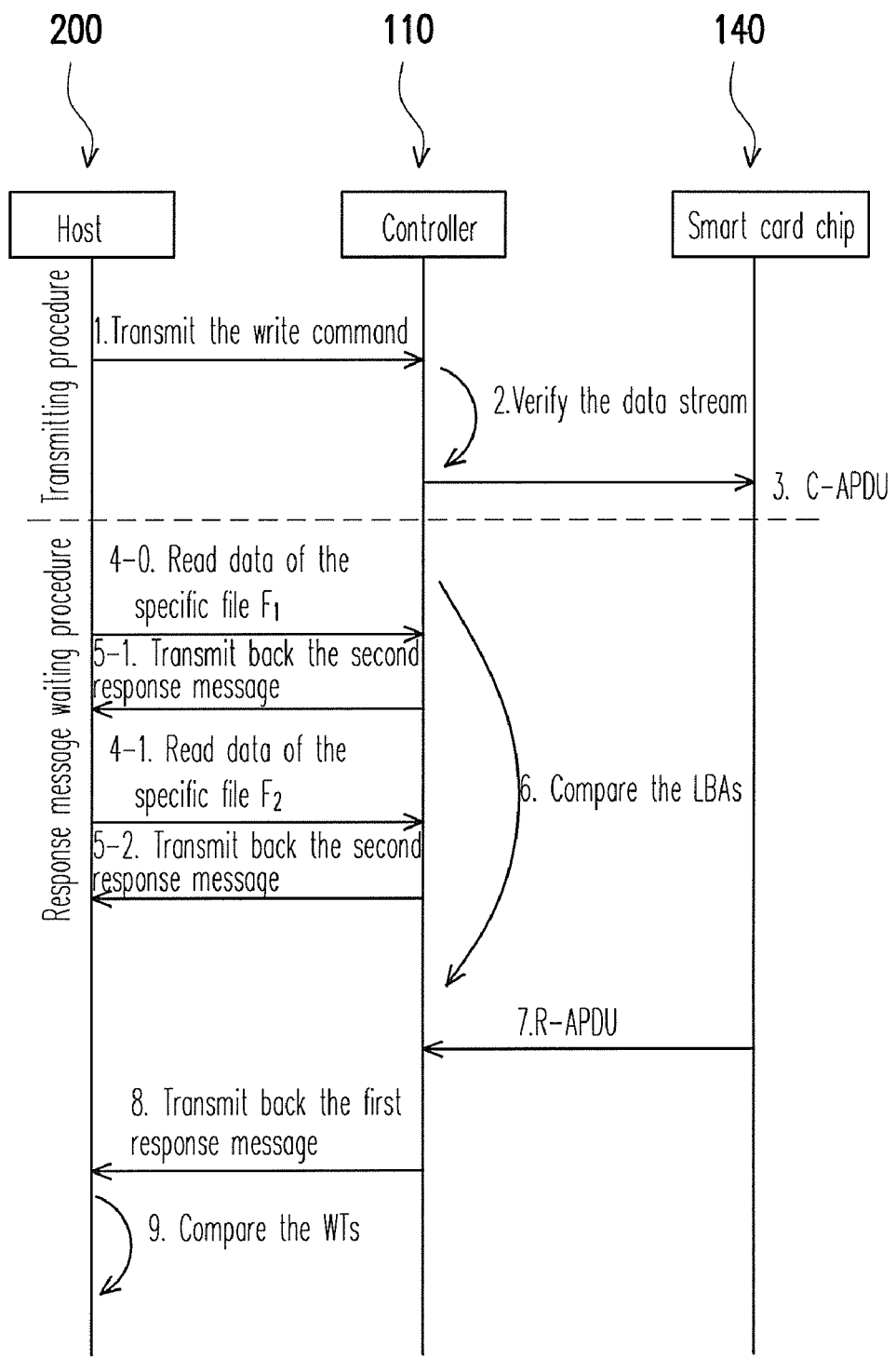
FIG. 16 is a schematic data flow diagram illustrating the fourth exemplary embodiment of the present invention.

Referring to FIG. 14 to FIG. 16, FIG. 14 is a flow chart illustrating the operations of the host 200 according to the fourth exemplary embodiment of the present invention. FIG. 15 is a flow chart illustrating the operations of the peripheral device 100 according to the fourth exemplary embodiment of the present invention. FIG. 16 is a schematic data flow diagram illustrating the fourth exemplary embodiment of the present invention.

The flow chart shown in FIG. 14 is similar to the flow chart shown in FIG. 3 except that the steps S407, S409, S415, and S417 of FIG. 3 are replaced with steps S407', S409', S415', and S417' of FIG. 14. The steps S401, S403, S405, S411, S413, S419, and S421 in FIG. 14 are the same as those in FIG. 3 and thus are not repeated herein. At step S407', the host 200 sets a target file $F_t$ as a first specific file $F_1$. Afterwards, the host 200 transmits a read command to the peripheral device 100 (step S409'). Here, the read command is set to read the target file $F_t$ in the non-volatile memory 130. In addition, at step S415', the host 200 determines whether the current target file $F_t$ is the last specific file $F_N$. If the current target file $F_t$ is the last specific file $F_N$, it means that the host 200 has transmitted N read commands to the peripheral device 100, such that the host 200 sets the current target file $F_t$ as the first specific file $F_1$ again (step S407'). However, if the current target file $F_t$ is not the last specific file $F_N$, the host 200 then sets the target file $F_t$ as a specific file (step S417') by increasing the variable t by one. In addition, in another exemplary embodiment of the present invention, initial LBAs of the specific files $F_1$ to $F_N$ can be $B_1$ to $B_N$ respectively (similar to the LBAs $A_1$ to $A_N$ as described in the first exemplary embodiment).

The flow chart shown in FIG. 15 is similar to the flow chart shown in FIG. 4 except that the steps S501 and S513 of FIG. 15 are replaced with step S501' and S513' of FIG. 8. The rest of the steps in the two flow charts are the same and thus not repeated herein. In step S501', the micro processing unit 110a of the controller 110 first records the LBAs $B_1$ to $B_N$ of the specific files $F_1$ to $F_N$. At step S513', the micro processing unit 110a of the controller 110 determines whether the address designated by the received read command belongs to the specific files $F_1$ to $F_N$, i.e., the micro processing unit 110a determines whether the received read command is set to read the data stored on the LBAs $B_1$ to $B_N$. The flow chart shown in FIG. 16 is similar to the flow chart shown in FIG. 5 except that the read command the host 200 transmits to the controller 110 is set to read the specific files $F_1$ to $F_N$ during the response message waiting procedure. In addition, before the controller 110 receives the response message from the smart card chip 140, the controller 110 compares the address designated by the read command with the LBAs $B_1$ to $B_N$ to determine if the addresses match.

Also, in another exemplary embodiment of the present invention, prior to recording the LBAs $B_1$ to $B_N$ of the specific files $F_1$ to $F_N$, the micro processing unit 110a first determines whether the specific files $F_1$ to $F_N$ exist in the non-volatile memory 130. If any one of the specific files $F_1$ to $F_N$ does not exist in the non-volatile memory 130, the micro processing unit 110a will create the specific file that does not exist in the non-volatile memory 130.

Moreover, the technique to verify the accuracy of the response message by examining the read tokens in the second exemplary embodiment of the present invention can be applied to the application of using the specific files $F_1$ to $F_N$ in the fourth exemplary embodiment. In other words, in the second exemplary embodiment, the read commands can be modified to read the data stored on the LBAs $B_1$ to $B_N$ of the plurality of specific files $F_1$ to $F_N$ rather than the data stored on the LBAs $A_1$ to $A_N$ of the single specific file.

In summary, in the present invention, the host adds the specific mark into the data stream to be transmitted to the chip. Therefore, the controller can determine whether the data stream is a data stream to be transmitted to a specific chip by determining whether the data stream has the specific mark. In addition, during the procedure for waiting the response message from the chip, the controller executes the read commands to read the data stored on the specific LBAs and transmits back the predetermined data stream (e.g., a data stream with all zero bits). When the chip generates a response message, the controller transmits back the response message (e.g. a data stream in which not all bits are zeroes). Herein, the write token is used to verify the accuracy of transmitted-back data, so that the host can determine the received response message as the previous cached response message in the cache or the current response message generated by the chip. As such, the host can transmit the data or commands to the chip, and the response message generated by the chip can be inerrably received.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for transmitting a data stream from a host to a peripheral device with a chip, the method comprising:
generating a write token by a host, and embedding the write token in a first data stream;
recording the write token in the host after the write token has been generated;
transmitting a first write command to the peripheral device, the first write command being set to write the first data stream to the peripheral device;
transmitting at least a portion of the first data stream to the chip, and recording the write token embedded in the first data stream;
sequentially transmitting a plurality of read commands to the peripheral device until the host receives a first response message from the peripheral device, wherein data within a specific data region of the first response message are produced by the chip in response to receiving at least a portion of the first data stream, and the first response message comprises the write token, wherein the read commands are set to read data stored on a plurality of logical block addresses; and
judging whether the write token embedded in the response message transmitted back from the peripheral device to the host is identical with the write token recorded in the host.

2. The method as claimed in claim 1, further comprising:
determining whether any data stream transmitted from the host to the peripheral device has a specific mark; and
when the data stream transmitted from the host to the peripheral device has the specific mark, transmitting at least a portion of the data stream having the specific mark to the chip.

3. The method as claimed in claim 2, wherein the peripheral device further comprises a non-volatile memory, and the method further comprises:
when the data stream transmitted from the host to the peripheral device lacks the specific mark, writing the data stream lacking the specific mark into the non-volatile memory.

4. The method as claimed in claim 1, wherein the peripheral device further comprises a non-volatile memory, and the method further comprises:
determining whether any read command transmitted from the host to the peripheral device is set to read data stored on the plurality of logical block addresses; and
reading data correspondingly from the non-volatile memory according to an address designated by the read command when the read command is not set to read data stored on the plurality of logical block addresses.

5. The method as claimed in claim 1, further comprising:
when the write token in the response message transmitted back from the peripheral device to the host is different from the write token recorded in the host, continuously transmitting the read commands to the peripheral device until the first response message is received.

6. The method as claimed in claim 1, further comprising:
recording the write token in the host after the write toke has been generated; and
updating the write token recorded in the host to transmit the updated write token to the peripheral device with the second write command before the host transmits a second write command to the peripheral device to transmit data to the chip.

7. The method as claimed in claim 1, further comprising:
adding a corresponding read token to the response message for responding to the plurality of read commands that would be transmitted back to the host; and
determining whether the read token in the response message received by the host is identical with a system value.

8. The method as claimed in claim 7, further comprising:
when the write token in the response message that would be transmitted back from the peripheral device to the host is identical with the write token recorded in the host, and the read token in the response message received by the host is identical with the system value, determining whether differences between the read tokens embedded in at least three response messages consecutively received by the host are a constant.

9. The method as claimed in claim 8, wherein the read commands corresponding to the at least three response messages are set to read data stored on a plurality of non-adjacent logical block addresses of the plurality of logical block addresses.

10. The method as claimed in claim 1, further comprising:
executing a third write command to write data into a temporary file of the peripheral device after any one of the read commands is transmitted to the peripheral device.

11. The method as claimed in claim 10, further comprising:
executing the third write command to write data into the temporary file after the first write command has been transmitted to the peripheral device.

12. The method as claimed in claim 10, further comprising:
cleaning the temporary file when a size of the temporary file exceeds a predetermined volume.

13. The method as claimed in claim 1, wherein the write token is generated according to a system time of the host.

14. The method as claimed in claim 1, wherein the write token is a random number.

15. The method as claimed in claim 1, wherein data stored on the plurality of logical block addresses belong to a single specific file.

16. The method as claimed in claim 15, wherein the peripheral device further comprises a non-volatile memory, and the method further comprises:
determining whether the single specific file exists in the non-volatile memory, and
when the single specific file has not yet existed in the non-volatile memory, creating the single specific file in the non-volatile memory.

17. The method as claimed in claim 1, wherein data stored on the plurality of logical block addresses belong to a plurality of specific files.

18. The method as claimed in claim 17, wherein the peripheral device further comprises a non-volatile memory, and the method further comprises:
determining whether the plurality of specific files exists in the non-volatile memory; and
when any one of the plurality of specific files has not yet existed in the non-volatile memory, creating that one of the specific files in the non-volatile memory.

19. The method as claimed in claim 1, wherein the host comprises a cache, and all commands and data between the host and the peripheral device are transmitted through the cache.

20. The method as claimed in claim 19, wherein a total amount of data stored on the plurality of logical block addresses is larger than or equal to a size of the cache.

21. The method as claimed in claim 1, wherein the peripheral device operates without storing data on the plurality of logical block addresses.

22. The method as claimed in claim 1, further comprising:
after the peripheral device receives one of the plurality of read commands, when the host has not yet received the first response message yet, transmitting a second response message to the host from the peripheral device.

23. The method as claimed in claim 22, wherein data recorded at each bit within a specific data region of the second response message is zero.

24. The method as claimed in claim 1, wherein data recorded at bits within the specific data region of the first response message are not all zeroes.

25. A system for transmitting a data stream between a host and a peripheral device with a chip, the system comprising:
a data processing unit, disposed in the host for handing operations of the peripheral device; and
a controller, disposed in the peripheral device and electrically connected to the chip;
wherein the host generates a write token and embeds the write token in a first data stream;
wherein the host operates the data processing unit to transmit a write command to the controller, and the write command is set to write the first data stream to the peripheral device;
wherein the controller transmits at least a portion of the first data stream to the chip and records the write token embedded in the first data stream;
wherein when the host operates the data processing unit, the host sequentially transmits a plurality of read commands to the peripheral device until receiving a first response message from the controller, wherein data stored within a specific data region of the first response message are produced by the chip in response to receiving at least a portion of the first data stream, the first response message has the write token, and the read commands are set to read data stored on a plurality of logical block addresses;
wherein when the host operates the data processing unit, the host records the write token and compares to determine whether the write token, which is embedded in the response message transmitted back from the peripheral device to the host, is identical with the write token recorded in the host.

26. The system as claimed in claim 25, wherein the controller determines whether any data stream transmitted from the host to the peripheral device has a specific mark, and when the data stream transmitted from the host to the peripheral device has the specific mark, the controller transmits at least a portion of the data stream having the specific mark to the chip.

27. The system as claimed in claim 26, wherein the peripheral device further comprises a non-volatile memory, and when the data stream transmitted from the host to the peripheral device lacks the specific mark, the controller writes the data stream lacking the specific mark into the non-volatile memory.

28. The system as claimed in claim 25, wherein the peripheral device further comprises a non-volatile memory, and the controller determines whether any read command transmitted from the host to the peripheral device is set to read data stored on the plurality of logical block addresses, such that for any read command, when the read command is not set to read data stored on the plurality of logical block addresses, the controller reads corresponding data from the non-volatile memory according to an address designated by the read command.

29. A controller, suitable for a peripheral device with a chip, comprising:
  a micro processing unit for controlling overall operations of the controller; and
  a buffer for storing data temporarily;
  wherein the micro processing unit transmits at least a portion of a first data stream from a host to the chip and records a write token embedded in the first data stream;
  wherein after the portion of the first data stream has been transmitted to the chip and before a first response message is transmitted from the micro processing unit to the host, the micro processing unit sequentially transmits a second response message to the host in respond to a plurality of read commands received from the host, wherein data within a specific data region of the first response message are produced by the chip in response to receiving at least a portion of the first data stream;
  wherein after the micro processing unit receives data within the specific data region of the first response message from the chip, the micro processing unit transmits the first response message to the host, and the first response message has the write token;
  wherein the write token is recorded in the host, and the host compares to determine whether the write token in the response message transmitted back from the peripheral device to the host is identical with the write token recorded in the host.

30. The controller as claimed in claim 29, wherein the micro processing unit determines whether any data stream transmitted from the host to the peripheral device has a specific mark, and when the data stream transmitted from the host to the peripheral device has the specific mark, the micro processing unit transmits at least a portion of the data stream comprising the specific mark to the chip.

31. The controller as claimed in claim 30, wherein the peripheral device further comprises a non-volatile memory, and when the data stream transmitted from the host to the peripheral device lacks the specific mark, the micro processing unit writes the data stream lacking the specific mark to the non-volatile memory.

32. The controller as claimed in claim 29, wherein the peripheral device further comprises a non-volatile memory, and the micro processing unit determines whether any read command transmitted from the host to the peripheral device is set to read data stored on the plurality of logical block addresses, such that for any read command, when the read command is not set to read data stored on the plurality of logical block addresses, the micro processing unit reads corresponding data from the non-volatile memory according to an address designated by the read command.

33. A controller, installed in a host, the controller comprising:
  a micro processing unit;
  a buffer, coupled to the micro processing unit; and
  a data stream transmitting module, coupled to the micro processing unit and having a plurality of machine commands that could be executed by the micro processing unit to perform a plurality of data stream transmitting steps for transmitting data streams between the host and a peripheral device with a chip, the plurality of data stream transmitting steps comprising:
  generating a write token, and embedding the write token in a first data stream;
  transmitting a first write command to the peripheral device, wherein the first write command is set to write the first data stream to the peripheral device;
  transmitting at least a portion of the first data stream to the chip and recording the write token embedded in the first data stream;
  sequentially transmitting a plurality of read commands to the peripheral device until the host receives a first response message from the peripheral device, wherein data stored within a specific data region of the first response message are produced by the chip in response to receiving at least a portion of the first data stream, and the first response message has the write token, the plurality of read commands is set to read data stored on a plurality of logical block addresses;
  recording the write token in the host after the write toke has been generated; and
  comparing to determine whether the write token in the response message transmitted back from the peripheral device to the host is identical with the write token recorded in the host.

34. The controller as claimed in claim 33, wherein the data stream transmitting steps further comprise:
  determining whether any data stream transmitted from the host to the peripheral device has a specific mark; and
  when the data stream transmitted from the host to the peripheral has the specific mark, transmitting at least a portion of the data stream having the specific mark to the chip.

35. The controller as claimed in claim 34, wherein the peripheral device further comprises a non-volatile memory, and the data stream transmitting steps further comprise:
  when the data stream transmitted from the host to the peripheral device lacks the specific mark, writing the data stream lacking the specific mark into the non-volatile memory.

36. The controller as claimed in claim 33, wherein the peripheral device further comprises a non-volatile memory, and the data stream transmitting steps further comprise:
  determining whether any read command transmitted from the host to the peripheral device is set to read data stored on the plurality of logical block addresses; and
  for any read command, when the read command is not set to read data stored on the plurality of logical block addresses, reading corresponding data stored from the non-volatile memory according to an address designated by the read command.

* * * * *